US012754101B2

(12) United States Patent
Govrin et al.

(10) Patent No.: US 12,754,101 B2
(45) Date of Patent: Oct. 6, 2026

(54) SYSTEM AND METHOD FOR MONITORING MOVING ELEMENTS

(71) Applicant: ODYSIGHT.AI LTD., Omer (IL)

(72) Inventors: Amir Govrin, Ramat Gan (IL); Yekaterina Dlugach, Mabuim (IL); Arik Priel, Givat Shmuel (IL); Ori Yaish, Beer Sheva (IL); Gal Magen, Beer Sheva (IL); Hasan Abu El Rab, Baqa el-Ghabiyye (IL); Gilad Senderovich, Petach Tikva (IL); Yishaia Zabary, Tel Aviv (IL)

(73) Assignee: ODYSIGHT.AI LTD., Omer (IL)

( * ) Notice: Subject to any disclaimer, the term of this patent is extended or adjusted under 35 U.S.C. 154(b) by 0 days.

(21) Appl. No.: 19/041,038

(22) Filed: Jan. 30, 2025

(65) Prior Publication Data

US 2025/0377263 A1 Dec. 11, 2025

Related U.S. Application Data

(63) Continuation of application No. 18/995,791, filed as application No. PCT/IL2023/050793 on Jul. 31, 2023.

(Continued)

(51) Int. Cl.
*G01M 13/00* (2019.01)
*G01M 13/023* (2019.01)
(Continued)

(52) U.S. Cl.
CPC ............ *G01M 13/00* (2013.01); *G01M 17/00* (2013.01); *G06T 7/0002* (2013.01); *G06T 7/20* (2013.01);
(Continued)

(58) Field of Classification Search
CPC ... G01M 13/00; G01M 13/023; G06T 7/0002; G06T 7/0004; G06T 2207/30232; G06T 7/20; H04N 23/74; H04N 25/531
See application file for complete search history.

(56) References Cited

U.S. PATENT DOCUMENTS 5,210,704 A 5/1993 Husseiny
5,233,293 A 8/1993 Huang et al.
(Continued)

FOREIGN PATENT DOCUMENTS

CN 105097057 A 11/2015
CN 107436263 A 12/2017
(Continued)

OTHER PUBLICATIONS

F. Claveau, S. Lord, D. Gingras and P. Fortier, "Mechanical Vibration Analysis Using an Optical Sensor," IEEE Seventh SP Workshop on Statistical Signal and Array Processing, Quebec City, QC, Canada, 1994, pp. 429-432, doi: 10.1109/SSAP .1994.572534.
(Continued)

*Primary Examiner* — Matthew C Bella
*Assistant Examiner* — Janice E. Vaz
(74) *Attorney, Agent, or Firm* — The Roy Gross Law Firm, LLC; Roy Gross

(57) ABSTRACT

A system for monitoring a moving element within a monitored system, comprising: an illumination device configured to periodically provide instantaneous light to a longitudinal moving element; an image sensor configured to capture at least one image of at least a portion of the moving element; and one or more processors configured to: obtain one or more images of the moving element during motion under illumination emitted by the illumination device; analyze an image to determine whether one or more failure modes are present within the captured portion of the moving element;
(Continued)

and register the image with one or more other images to obtain further information about the at least one failure mode.

20 Claims, 18 Drawing Sheets

Related U.S. Application Data

(60) Provisional application No. 63/521,140, filed on Jun. 15, 2023, provisional application No. 63/394,150, filed on Aug. 1, 2022.

(51) Int. Cl.

| | |
|---|---|
| ***G01M 17/00*** | (2006.01) |
| ***G06T 7/00*** | (2017.01) |
| ***G06T 7/20*** | (2017.01) |
| ***G06T 7/30*** | (2017.01) |
| ***G06T 7/70*** | (2017.01) |
| ***H04N 23/56*** | (2023.01) |
| ***H04N 23/74*** | (2023.01) |
| ***H04N 25/531*** | (2023.01) |

(52) U.S. Cl.
CPC .................. *G06T 7/30* (2017.01); *G06T 7/70* (2017.01); *H04N 23/56* (2023.01); *G01M 13/023* (2013.01); *G06T 2207/30164* (2013.01); *G06T 2207/30232* (2013.01); *H04N 23/74* (2023.01); *H04N 25/531* (2023.01)

(56) References Cited

U.S. PATENT DOCUMENTS 5,732,147 A 3/1998 Tao
5,973,770 A 10/1999 Carter et al.
6,873,411 B2 3/2005 Sebok et al.
6,988,610 B2 1/2006 Fromme et al.
7,131,529 B2 11/2006 Meade
7,272,253 B2 9/2007 Katsuta et al.
7,385,694 B2 6/2008 Kolp et al.
7,434,986 B2 10/2008 Ignatowicz
7,609,874 B2 10/2009 Eswara et al.
7,702,435 B2 4/2010 Pereira et al.
7,783,433 B2 8/2010 Gordon et al.
7,880,885 B1 2/2011 Stana et al.
8,009,515 B2 8/2011 Cecala et al.
8,042,765 B1 10/2011 Nance
8,134,472 B2 3/2012 Cutsforth
8,335,601 B2 12/2012 Sham et al.
8,779,943 B2 7/2014 Wölcken et al.
8,842,874 B1 9/2014 Alphenaar et al.
8,982,207 B2 3/2015 Jang
9,196,031 B2 11/2015 Hikida et al.
9,285,296 B2 3/2016 Georgeson et al.
9,501,820 B2 11/2016 Nissen et al.
9,550,583 B2 1/2017 Szeto
9,651,464 B1 5/2017 Salzbrenner et al.
9,786,042 B2 10/2017 Venkatesha et al.
9,875,409 B2 1/2018 Ohmura et al.
9,898,815 B2 2/2018 Yamamoto et al.
9,921,132 B2 3/2018 Nissen et al.
10,373,301 B2 8/2019 Chaudhry et al.
10,438,341 B2 10/2019 Torres et al.
10,459,615 B2 10/2019 Hay
10,521,898 B2 12/2019 Wang et al.
10,650,511 B2 5/2020 Jones et al.
10,789,785 B2 9/2020 Mylaraswamy et al.
10,861,147 B2 12/2020 Wang
10,885,664 B1 1/2021 Schmidt
10,909,781 B2 2/2021 Bharadwaj et al.
11,043,046 B2 6/2021 Jasper
11,142,345 B2 10/2021 Giroux et al.
11,169,288 B1 11/2021 Johnson et al.
11,288,972 B2 3/2022 Bristow et al.
11,299,294 B2 4/2022 Parker et al.
11,341,410 B1 5/2022 Johnson et al.
11,498,668 B2 11/2022 Moravek et al.
11,526,390 B2 12/2022 Mead et al.
11,568,292 B2 1/2023 Ledbetter et al.
11,639,915 B2 5/2023 Giurgiutiu et al.
11,709,113 B2 7/2023 Baskin et al.
11,734,623 B2 8/2023 Bristow et al.
11,780,591 B2 10/2023 Kim et al.
11,780,610 B2 10/2023 Dunning et al.
11,794,926 B2 10/2023 Chavez et al.
11,926,436 B2 3/2024 Beaven et al.
12,055,055 B1 8/2024 Goyette et al.
12,073,566 B2 8/2024 Pal et al.
12,146,416 B2 11/2024 Goyette et al.
2002/0054694 A1 5/2002 Vachtsevanos et al.
2003/0021455 A1 1/2003 Dixon et al.
2004/0154887 A1 8/2004 Nehl et al.
2005/0075846 A1 4/2005 Kim
2005/0120795 A1 6/2005 Nehl et al.
2006/0131381 A1 6/2006 Timmis et al.
2006/0241927 A1 10/2006 Kadambe et al.
2008/0199193 A1 8/2008 Nakazato et al.
2009/0146601 A1 6/2009 Le
2010/0161255 A1 6/2010 Mian et al.
2010/0246974 A1* 9/2010 Choi .................... G06T 7/0004 382/209
2011/0060568 A1 3/2011 Goldfine et al.
2011/0102850 A1 5/2011 Watanabe
2011/0137613 A1 6/2011 Sakaguchi
2012/0041639 A1 2/2012 Followell et al.
2012/0179169 A1 7/2012 Swarup et al.
2013/0010094 A1 1/2013 Satish et al.
2014/0046881 A1 2/2014 Loesl et al.
2015/0062328 A1* 3/2015 Lauffer ................ G06T 7/0004 348/125
2015/0222495 A1 8/2015 Mehta et al.
2015/0323425 A1 11/2015 Bang et al.
2016/0018427 A1 1/2016 Streibl et al.
2016/0025756 A1 1/2016 Pollack et al.
2016/0123998 A1 5/2016 Macintyre et al.
2016/0217587 A1 7/2016 Hay
2016/0300341 A1 10/2016 Hay et al.
2017/0220718 A1 8/2017 Freeman et al.
2017/0284849 A1 10/2017 Baba
2017/0333941 A1 11/2017 Park et al.
2018/0130198 A1 5/2018 Kikuchi et al.
2018/0276912 A1 9/2018 Zhou
2018/0341248 A1 11/2018 Mehr et al.
2018/0365530 A1 12/2018 Kluckner et al.
2019/0025813 A1 1/2019 Cella et al.
2019/0033263 A1 1/2019 Giurgiutiu et al.
2019/0033848 A1 1/2019 Cella et al.
2019/0121349 A1 4/2019 Cella et al.
2019/0137986 A1 5/2019 Cella et al.
2019/0236456 A1 8/2019 Kim et al.
2019/0339684 A1 11/2019 Cella et al.
2020/0057880 A1 2/2020 Mizutani et al.
2020/0064277 A1* 2/2020 Hucker .............. G01N 21/9515
2020/0073362 A1 3/2020 Shapiro et al.
2020/0103250 A1 4/2020 Yashan et al.
2020/0166909 A1 5/2020 Noone et al.
2020/0190959 A1 6/2020 Gooneratne et al.
2020/0191122 A1 6/2020 Bartschat et al.
2021/0053227 A1 2/2021 Wartenberg et al.
2021/0125428 A1 4/2021 Tedesco et al.
2021/0174486 A1 6/2021 Chowhan
2021/0383160 A1 12/2021 Vander Neut et al.
2021/0407121 A1 12/2021 Shapiro et al.
2022/0004179 A1 1/2022 Badkoubeh
2022/0024577 A1 1/2022 Stamatovski
2022/0122638 A1 4/2022 Hay et al.
2022/0137080 A1 5/2022 Vansickler et al.
2022/0138622 A1 5/2022 Patel et al.
2022/0210309 A1* 6/2022 Feingold ............ A61B 1/00009

(56) References Cited

U.S. PATENT DOCUMENTS

| | | | |
|---|---|---|---|
| 2022/0334573 A1 | 10/2022 | Negri et al. | |
| 2022/0402008 A1 | 12/2022 | Li et al. | |
| 2025/0265695 A1* | 8/2025 | Bronars | G06T 7/0002 |

FOREIGN PATENT DOCUMENTS

| | | | |
|---|---|---|---|
| CN | 111977025 | A | 11/2020 |
| CN | 114604768 | A | 6/2022 |
| EP | 0526489 | A1 | 2/1993 |
| EP | 1475627 | A2 | 11/2004 |
| EP | 2529932 | A1 | 12/2012 |
| EP | 3326954 | A1 | 5/2018 |
| GB | 2576787 | A | 3/2020 |
| GB | 2587416 | A | 3/2021 |
| JP | 3236387 | B2 | 12/2001 |
| JP | 2019117163 | A | 7/2019 |
| JP | 6765428 | B2 | 10/2020 |
| WO | 2006053433 | A1 | 5/2006 |
| WO | 2016011099 | A1 | 1/2016 |
| WO | 2021036641 | A1 | 3/2021 |
| WO | 2022162663 | A1 | 8/2022 |
| WO | 2023209717 | A1 | 11/2023 |
| WO | 2024/028852 | A1 | 2/2024 |
| WO | 2024/028867 | A1 | 2/2024 |
| WO | 2024/028868 | A1 | 2/2024 |
| WO | 2024/028869 | A1 | 2/2024 |

OTHER PUBLICATIONS

Vanraj et "Intelligent predictive maintenance dynamic systems using condition monitoring and signal processing techniques—A review," 2016 International Conference on Advances in Computing, Communication, & Automation (ICACCA) (Spring), Dehradun, India, 2016, pp. 1-6. doi: 10.1109/ICACCA.2016.7578870.

Au, Joy et al. "Challenges and Opportunities of Computer Vision Applications in Aircraft Landing Gear", 2022 IEEE Aerospace Conference (AERO), IEEE,Mar. 5, 2022, pp. 1-10. doi: 10.1109/AERO53065.2022.9843684.

Zhang, Mengchao et al. : "A Computer Vision Based Conveyor Deviation Detection System", Applied Sciences, vol. 10, No. 7, Apr. 1, 2020 (Apr. 1, 2020), pp. 1-10. https://doi.org/10.3390/app10072402.

Tchakoua, P., Wamkeue, R., Tameghe, T. A., & Ekemb, G. (2013). A review of concepts and methods for wind turbines condition monitoring. 2013 World Congress on Computer and Information Technology (WCCIT). doi:10.1109/wccit.2013.6618706.

Jin, W., Shi, Z., Siegel, D., Dersin, P., Douziech, C., Pugnaloni, M., . . . Lee, J. (2015). Development and evaluation of health monitoring techniques for railway point machines. 2015 IEEE Conference on Prognostics and Health Management (PHM). doi:10.1109/icphm.2015.7245016.

Qiao, W., & Lu, D. (2015). A Survey on Wind Turbine Condition Monitoring and Fault Diagnosis—Part II: Signals and Signal Processing Methods. IEEE Transactions on Industrial Electronics, 62(10), 6546-6557. doi:10.1109/tie.2015.2422394.

Govrin et al. (2022). U.S. Appl. No. 63/394,150, filed Aug. 1, 2022, 98pp.

Govrin et al. (2023). U.S. Appl. No. 63/521,140, filed Jun. 15, 2023, 78pp.

Govrin et al. (2022). U.S. Appl. No. 63/394,138, filed Aug. 1, 2022, 69pp.

Edgar A. Ossa et al. "Handbook of Materials Failure Analysis with Case Studies from the Aerospace and Automotive Industries", 2016, pp. 167-190, Chapter 8—Suspension and landing gear failures. http://dx.doi.org/10.1016/B978-0-12-800950-5.00008-9.

* cited by examiner

SYSTEM AND METHOD FOR MONITORING MOVING ELEMENTS

CROSS-REFERENCE TO RELATED APPLICATIONS

This application is a Continuation of U.S. patent application Ser. No. 18/995,791, filed Jan. 16, 2025, which is a National Phase of PCT Patent Application No. PCT/IL2023/050793, having International filing date of Jul. 31, 2023, which claims the benefit of Provisional Patent Application No. 63/394,150, entitled "Systems and Methods for Monitoring Cables Integrity and Detecting Potential Faults Thereof", filed Aug. 1, 2022, and Provisional Patent Application No. 63/521,140, entitled "System and Method for Monitoring Longitudinal Moving Elements", filed Jun. 15, 2023, which are hereby incorporated by reference in their entirety and for all purposes without giving rise to disavowment.

TECHNICAL FIELD

The present disclosure relates to an automated system and method for monitoring moving elements in general, and monitoring such elements by relative movement, in particular.

BACKGROUND

Machine maintenance is a critical part of the operation of any plant or facility that uses mechanical or other systems, and is required for lowering the risk of accidents and injuries, minimizing downtime of the system or components thereof, and meeting schedules.

Machine maintenance may include regularly scheduled service visits, routine checks, and schedules or emergency repairs. Part of the maintenance may include replacement, repair, or readjustment of parts that are worn, damaged, misaligned, or the like, or are expected to be so before the next scheduled visit.

Currently, most maintenance operations are performed every predetermined period of time, which may be wasteful on one hand since fully functional units may be replaced only because this is what the protocol dictates, while other problems may go unnoticed and may develop or cause damage before ethe next maintenance visit is scheduled.

Within the branch of monitoring systems and elements thereof, a particularly hard challenge relates to analyzing the health status of moving objects, and in particular, discovering anomalies that do not affect the movement of an object. The movement of an object makes it hard for a human to examine the object thoroughly, especially when the object is complex, comprises a plurality of members or moves fast. Moreover, due to the movement, it is hard to capture a sharp image of the object which can be analyzed offline by a human user or a computerized system. On the other hand, monitoring the element only when it is static may disable the detection of certain problems, may disrupt the proper operation of the device the element is connected to, and may also not ensure that all areas and segments of the element are monitored as required.

In addition, in some implementations the moving objects are positioned in hard to reach locations.

A specific type of such objects is the longitudinal moving elements which are supposed to move relative to their long axis, such as cables, straps, ropes, or the like, which are generally connected at one or more ends to other objects. Some examples include elevators, conveyor belts, escalators, helicopter cable systems, (flight) control cables, cargo winches or the like. Such elements may move horizontally, vertically or diagonally.

Another specific type of such elements are elements which move in radial motion around a center, such as fans.

Yet another specific type of such elements are cables wound around a drum, wherein the winding mechanism may also need monitoring and maintenance.

Some problems or failures to be detected in such elements such as a tear or stretch, are common to a plurality of types of elements, while others are more specific to one or more element types.

BRIEF SUMMARY

One exemplary embodiment of the disclosed subject matter is a system for monitoring a moving element within a monitored system, comprising: an illumination device configured to periodically provide instantaneous light to a longitudinal moving element; an image sensor configured to capture one or more images of at least a portion of the moving element, the image sensor comprising a rolling shutter; and one or more processors configured to: obtaining one or more images of the moving element during motion under illumination emitted by the illumination device, wherein said illumination device is configured to start illuminating the moving object after all rows or columns of a sensor of the image sensor are opened and end illuminating before any of the rows or columns is closed; and analyzing the images to determine whether one or more failure modes are present within the portion of the moving element as captured.

Another exemplary embodiment of the disclosed subject matter is a system for monitoring a moving element within a monitored system, comprising: an illumination device configured to periodically provide instantaneous light to a longitudinal moving element; an image sensor configured to capture one or more images of at least a portion of the moving element; and one or more processors configured to: obtain one or more images of the moving element during motion under illumination emitted by the illumination device; analyze one or more of the images to determine whether one or more failure modes are present within the captured portion of the moving element; and register an analyzed image with one or more other images to obtain further information about the failure modes. Within the system, said obtaining and analyzing are optionally performed repeatedly. Within the system, said obtaining and analyzing are optionally repeated until images of all parts of the moving elements have been obtained and analyzed within a predefined timeframe. The system can further comprise determining a part of the moving element to be captured next. Within the system, said registering optionally comprises registering a first image with a second image depicting a second area adjacent to an area captured in the first image. Within the system, said registering optionally comprises registering an image with a predetermined image for determining a location depicted in the image. The system can further comprise analyzing a trend of at least one of the failure modes at the location over time. The system can further comprise providing output indicating whether the failure modes are identified within the moving element. Within the system, the output is optionally provided by updating a database, sending a message, displaying a message on a display device, or issuing a vocal alert. The system can further comprise: obtaining an indication of whether the moving element is in motion relative to the monitored system; and performing said obtaining, said analyzing and said registering subject to the moving element being in motion. Within the system, said image sensor is optionally operated with a rolling shutter. Within the system, said illumination device is optionally configured to start illuminating the moving object after all rows or columns of a sensor of the image sensor are opened and end illuminating before any of the rows or columns is closed. Within the system, the moving element is optionally a longitudinal moving element. Within the system, the moving element is optionally a rotational moving element. Within the system, the moving element is optionally a cable. Within the system, the monitored system is optionally a system selected from the group consisting of: an elevator, a helicopter, a crane, a conveyor belt, a turbo fan, a sky tram, a cable car, and a cable winding machine.

Yet another exemplary embodiment of the disclosed subject matter is a system for monitoring a moving element within a monitored system, comprising: a motion sensor for determining whether the moving element is in motion; an illumination device configured to periodically provide instantaneous light to a longitudinal moving element; an image sensor configured to capture one or more images of at least a portion of the moving element; and one or more processors configured to: obtain an indication of whether the moving element is in motion relative to the monitored system; subject to the moving element being in motion: operate the illumination device to emit light at predetermined times; obtain one or more images of the moving element under illumination emitted by the illumination device; and analyze the images to determine whether one or more failure modes are is present within the moving element. Within the system, the illumination device is optionally adjusted to be activated and inactivated in at most 10 mSec.

Yet another exemplary embodiment of the disclosed subject matter is a system for monitoring a rescue hoist cable descending from a helicopter, comprising: an illumination device configured to periodically provide instantaneous light to a drum upon which the rescue hoist cable is wound; an image sensor configured to capture one or more images of the drum; and one or more processors configured to: operate the illumination device to emit light at predetermined times; obtain one or more images of at least a portion of the drum when the illumination device is operated; and analyze the image of the drum to determine whether one or more failure modes are present within the moving element. Within the system, the failure mode is optionally a failure of the cable. Within the system, the failure mode is optionally a failure of a winding mechanism configured to wind the cable around the drum. Within the system, analysis of the image optionally comprises determining that a failure mode exists, subject to windings being of different widths. Within the system, analysis of the image optionally comprises determining that a failure mode exists, subject to lines separating widths being non parallel. Within the system, analysis of the image optionally comprises determining that a failure mode exists, subject to lines separating cable strands being non parallel.

Yet another exemplary embodiment of the disclosed subject matter is a system for monitoring a moving element within a monitored system, comprising: an illumination device configured to periodically provide instantaneous light to a longitudinal moving element; an image sensor, the image sensor configured to capture one or more images of at least a portion of the moving element; and one or more processors configured to: obtain an image of the moving element during motion under illumination emitted by the illumination device; and analyze the image to determine whether one or more failure modes are present within the moving element, wherein the system is arranged such that the image sensor captures a same location within the moving element throughout an exposure time used for capturing the one image. Within the system, the image sensor is optionally moved throughout the exposure time in accordance with the moving object. The system can further comprise a mirror, wherein the system is arranged such that the mirror is moved throughout the capturing time of the image in accordance with the moving object, thereby reflecting the same location within the moving element to the image sensor throughout the capturing time. Within the system, the image sensor optionally captures different portions of the moving element in different images.

Yet another exemplary embodiment of the disclosed subject matter is a system for monitoring a moving element within a monitored system, comprising: an illumination device configured to periodically provide instantaneous light to a longitudinal moving element; an image sensor configured to capture one or more images of the moving element; one or more processors configured to: obtain an indication of whether the moving element is in motion relative to the monitored system; subject to the longitudinal moving element being in motion: obtaining one or more images of the moving element under illumination emitted by the illumination device; and analyzing the images to determine whether one or more of a collection of predetermined failure modes is present within the moving element. Within the system, the moving element is optionally a longitudinal moving element. Within the system according to any of the preceding claims, the processor(s) is optionally further configured to: examining the images to determine whether any of them comprises a change relative to a previously captured image; subject to detecting a change, performing said analyzing; and subject to determining that none of the collection of predetermined failure modes is present within the longitudinal moving element, suppressing any action related to the change. Within the system, the processor(s) is optionally further configured to add the image and a corresponding label to a training set of a prediction engine. Within the system, subject to the longitudinally moving element being in motion the processor(s) is optionally configured to upload the image to a remote storage device, and wherein analyzing the image is optionally performed by a second computing platform having access to the image as uploaded to the remote storage device. Within the system, the moving element is optionally a cable. Within the system, the collection of predetermined failure modes optionally comprises corrosion of the moving element. Within the system, the collection of predetermined failure modes optionally comprises local damage of the cable. Within the system, the collection of predetermined failure modes optionally comprises global damage of the cable. Within the system, the collection of predetermined failure modes optionally comprises lubrication decay of the cable. Within the system, the moving element is optionally a cable connected having one end connected to an elevator chamber and another end connected to a counterweight. The system can further comprise a communication device for receiving information about a position of the moving element from a controller of a device comprising the moving element. Within the system, the processor(s) is optionally further configured to determine a position of the moving element by identifying and monitoring over time at least one mark on the moving element. Within the system the processor is optionally further configured to: activate the illumination device and the static image sensor to operate when the longitudinally moving element is at a required position. The system is optionally installed in an engine room of a device comprising the longitudinally moving element. The system is optionally installed statically relative to the monitored system. The system is optionally installed in a shaft along which the longitudinally moving element is located. Within the system, analyzing the images optionally comprises segmenting an image to detect at least a part of the moving element. Within the system, determining whether one of the predetermined failure modes is present is optionally performed using a machine learning engine. Within the system, the processor(s) is optionally further configured to apply a model for analyzing a severity of the at least one of the collection of predetermined failure modes. Within the system, the processor(s) is optionally further configured to apply a model for determining a trend associated with the at least one of the collection of predetermined failure modes. Within the system, the processor(s) is optionally further configured to analyze a plurality of images over time in order to detect trends of failure modes. Within the system, the processor(s) is optionally further configured to take an action, the action comprising one or more items selected from the group consisting of: sending a report; sending a message to a person in charge; stopping the monitored system; and scheduling a technician visit. Within the system, the report optionally comprises one or more items selected from the group consisting of: a detected situation; an indication of a position of the longitudinally moving element; a fault developing into a failure; a severity of a detected fault; a severity of a detected failure mode; a time stamp; a recommendation related to maintenance of the monitored system; and a recommendation to schedule a technician visit. Within the system, the processor(s) is optionally further configured to operate the image sensor to capture a plurality of images depicting a full length of the longitudinal moving element. Within the system, the processor(s) is optionally further configured to operate the image sensor to capture a plurality of images depicting a full perimeter of the moving element. Within the system, the processor(s) is optionally further configured to operate the image sensor to capture a plurality of images depicting a full perimeter at every position along a full length of the moving element.

Yet another exemplary embodiment of the disclosed subject matter is a method for monitoring a moving element within a monitored system, comprising: obtaining an indication of whether a moving element within a monitored system is in motion relative to the monitored system; subject to the moving element being in motion: obtaining one or more images of the moving element under illumination emitted by an illumination device; and analyzing the images to determine whether one or more of a collection of predetermined failure modes is present within the moving element.

Yet another exemplary embodiment of the disclosed subject matter is a system for monitoring a cable during motion within a monitored system, comprising: an image sensor configured to capture one or more images of the cable, one or more processors configured to: operate the capture device to obtain one or more images of the cable, in synchronization with a device for assessing which part of the cable is monitored; and analyzing the images to determine whether one or more of a collection of predetermined failure mode is present within the cable. Within the system, the image sensor is optionally positioned statically relative to the monitored system. Within the system, the image sensor is optionally positioned statically relative to the cable. Within the system, the image sensor optionally comprises a plurality of image sensors located on a ring surrounding the cable, thereby capturing a full perimeter of the cable. Within the system, the cable is optionally secured at one end to an element stationary with regards to the movement of the cable. Within the system, the monitored system is optionally a helicopter.

Yet another exemplary embodiment of the disclosed subject matter is a system for monitoring a longitudinal moving element during motion within a monitored system, comprising: an image sensor configured to capture one or more images of the longitudinal moving element, wherein the longitudinal moving element is secured at one end to another element stationary with regards to the movement of the longitudinal moving element; one or more processors configured to: obtain an indication of whether the longitudinal moving element is in motion relative to the monitored system; subject to the longitudinal moving element being in motion: operating the capture device to obtain one or more images of the longitudinal moving element; and analyzing the images to determine in synchronization with a device for assessing which part of the longitudinal moving element is monitored, whether at least one of a collection of predetermined failure mode is present within the longitudinal element. Within the system, the longitudinal moving element is optionally monitored by a capture device that is static relative to the monitored system. Within the system, the longitudinal moving element is optionally monitored by a capture device that moves in a plane perpendicular to an advancement direction of the longitudinal moving element. Within the system, the longitudinal moving element is optionally monitored by a capture device that captures different windings of the cable.

Yet another exemplary embodiment of the disclosed subject matter is a system for monitoring a moving element during motion within a monitored system, comprising: one or more image sensors configured to capture one or more images of the moving element; one or more processors configured to: obtain an indication of whether the moving element is in motion relative to the monitored system; subject to the moving element being in motion: operating the image sensor to capture two or more images of the moving element; and identifying a segment of the moving element in one image two or more images; upon detecting the segment in a second image, indicating an area of the moving element adjacent to the segment as monitored; analyzing the images to determine whether one or more of a collection of predetermined failure modes is present within the longitudinal moving element; and repeating the steps above until all external parts of the moving element have been captured and analyzed. Within the system, the images optionally overlap along a direction parallel to the moving direction of the moving element. Within the system, the images optionally overlap along a direction perpendicular to the moving element. Within the system, detecting the segment in a second video frame is optionally performed by registering the at least two video frames. Within the system, detecting the segment in a second video frame is optionally used for detecting rotation of the moving element. Within the system, the processor(s) is optionally further configured to determine a fault or failure over the moving element as a whole.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
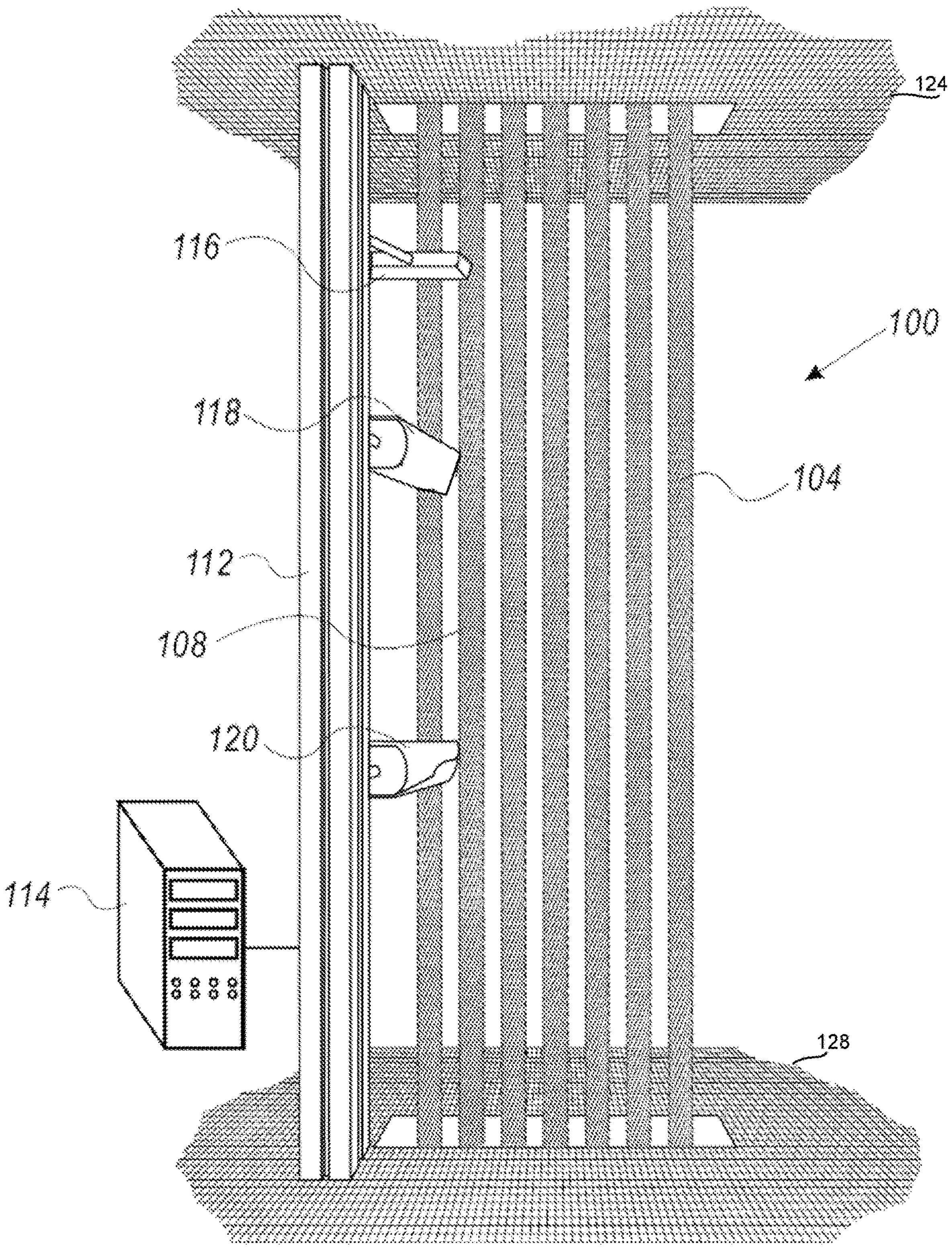
FIG. 1 is an illustration of the apparatus in an exemplary environment, in accordance with some exemplary embodiments of the disclosure.

In some embodiments of the disclosure the term "moving element" is to be widely construed to refer to any element such as but not limited to a cable, a strap, a rope, a belt, a chain, a bearing such as an elastomeric bearing or a Cardan Bearing, or the like, which is supposed to move. Moving may also relate to a device for collecting an element, such as a drum for winding a cable. Moving may be substantially in parallel to a long axis of the element, in a closed loop, or in any other manner.

In some use cases, the element may move linearly (horizontally, vertically, inclined, or the like) or piecewise linearly along its long dimension, and have at least one end thereof secured to an element that is stationary in regard to the movement of the element, such as but not limited to a crane, a helicopter, or the like.

In other use cases, the element may be attached on one end to a moving part of the monitored system, such as but not limited to an elevator or flight control cable.

In yet other use cases, the element may move in various patterns depending on the configuration and design of the system, such as in a circular or oval loop for example as a pulley belt. A "pulley belt" may refer to a broad category of belts used in various mechanical systems. A few examples of belts that fall under the generic term "pulley belt" include:

- V-Belt: a belt having a trapezoidal cross-section, designed to fit into V-shaped pulleys. V-belts may be used in various applications, such as automotive engines, industrial machinery, and Heating, Ventilation, and Air Conditioning (HVAC) systems.
- Timing Belt: a belt having teeth on the inner side that fit teeth on the pulley. A timing belt may be used in applications that require precise synchronization of shafts or where high torque transmission is necessary, such as in automotive engines and robotics.
- Flat Belt: a belt having a rectangular cross-section, used in applications where a wide, flat surface is required for power transmissions like conveyor systems, printing machines, and textile machinery.
- Serpentine Belt: a flat belt with multiple grooves on one side. Serpentine belts may be used in automotive engines to drive various accessories like an alternator, power steering pump, and air conditioning compressor.
- Round Belt: belt having a circular cross-section, may be used in applications that require high flexibility and minimal vibration. Round belts are often used in conveying systems, power transmission in small appliances, and some types of delicate machinery.

In some use cases, the element is a longitudinal element. For brevity, and unless noted otherwise, according to some embodiments the term "cable" is used interchangeably with the term "longitudinal moving element" and is not necessarily limited to a cable but can refer to any other longitudinal moving element.

In some use cases, the element moves in radial motion around a center. In these cases according to some embodiments, capturing and analyzing the motion enables for transforming the radial motion to longitudinal motion or the radial element to a longitudinal element, therefore such cases are included within the term "longitudinal moving element" or "longitudinal element".

In some embodiments of the disclosure, the term "fault" is to be widely construed to cover any undesired effect or process in a part of a machine, which may or may not lead to a failure, but requires follow-up, to analyze whether it needs to be repaired or replaced, whether the monitored object exhibits unusual appearance or functionality.

In some embodiments of the disclosure, the term "failure" is to be widely construed to cover any problem that can occur to a part of a monitored device, wherein the problem disables usage of the part, endangers the monitored device, a person or an object in the vicinity of the device, or the like.

In some embodiments of the disclosure, the term "failure mode" is to be widely construed to cover any manner in which a fault or failure may occur, such as rust, break, cack, rotation, or the like. It is appreciated that a part may be subject to a plurality of failure modes, related to different characteristics or functionalities thereof. For example, a cable may be rusted, as well as torn.

In some embodiments of the disclosure, the term "trend" or "trend of failure mode" is to be widely construed to cover any behavior over time of a fault, or a failure mode, when or under what circumstances the fault will turn into a failure. The trend is optionally associated with additional circumstances such as environmental conditions, usage characteristics of the device, characteristics of a user of a device, or the like.

In some embodiments of the disclosure, the term "situation" may refer to any abnormal situation, including but not limited to a fault, a failure, a failure mode, and a trend.

In some embodiments of the disclosure, the terms "prediction model", "prediction engine", "AI engine", or similar terms, are to be widely construed to cover any artificial intelligence (AI) engine, designed to receive input comprising an image or another representation of a monitored device, and provide an output comprising a probability of a fault, failure, failure mode or situation to take place given the other input parameters. The prediction engine may be implemented using a variety of technologies, such as any type of Artificial Neural Network (ANN) including deep NN, convolutional NN, or others. The prediction engine may also be implemented using any other machine learning technology.

In some embodiments the term "engine" may related to an "AI engine" as above, and also to other engines, such as an image analysis engine, a video analysis engine, a statistical computation engine, or the like.

One technical problem dealt with by the disclosed subject matter relates to the need to check the health of moving elements in monitored systems, whether the moving elements are fast-moving or not, and whether the elements are longitudinal moving elements, radial moving elements, or the like. For example, cables are among the most critical components of an elevator system, and the cables' health is crucial for the safety of the elevator. Thus, problems in the cables of an elevator or an escalator need to be detected and monitored as early as possible, such that the cables may be repaired or replaced well before any damage occurs. In another example, the health of a rescue cable of a helicopter and the associated winding mechanism are critical components as well and it is important to detect failures as early as possible. On the other hand, due to the awareness to the criticality of the systems, technician visits and part replacement may be scheduled to occur too often, and therefore incur inconvenience in stopping the elevator, and unnecessary repair or replace costs. Thus, there is a need for automatic ongoing monitoring of the health of critical parts such as the longitudinal moving elements. The term "ongoing" according to some embodiments may refer to continuous monitoring, to periodic monitoring sessions scheduled over time, to occasional monitoring sessions over time, or the like.

Another technical problem of some embodiments of the disclosure relates to the need to monitor the full length of the moving element, in order to avoid situations in which a failure mode develops or occurs in an area that is hard to reach or was not monitored regularly. In some situations, a longitudinal moving element may also need to be monitored from multiple directions, as only part of its perimeter can be seen from any point of view.

Yet another technical problem of the disclosure relates to the need to check the moving elements when in motion. This need arises since some of the failure modes may only be detected when a component, and in particular a cable or a belt, is in motion, and cannot be detected in a static position. Moreover, it may be uncomfortable for users of the system if the system needs to be immobilized for inspection, thus possibly causing shutdown of the system. Therefore, the monitoring may need to be performed during the normal operation of the system and not limited to times when the system is stationary. However, in some cases, checks should or can be performed when the longitudinal moving elements are stationary, for example when the system is typically idle such as an elevator in an office building during the night hours. A particular difficulty arises when monitoring elements that are moving in high velocity, whether linear, radial, or others, since due to the fast movements, the elements may be moving a substantial distance during the exposure time and make it hard to obtain sharp images which can be analyzed.

Yet another technical problem of the disclosure relates to the need to detect various types of failure modes, depending on the specific element and element type being monitored. Some failure modes, such as tears, rotations, or local or global deformations, may be common to different element types, while others may be more specific to one or more element types. For example, linearly moving elements may suffer from corrosion if made of aluminum, rust and lubrication problems if made of steel, patina developing on metals such as copper or bras, straps may suffer from tears or folds, belts used in loops may suffer from stretching, or the like. Moreover, while some failure modes are known, others may be realized only at a later time, for example learned from other systems, and added to the list of failure modes to be detected.

Yet another technical problem of the disclosure relates to detecting failure modes caused by the interrelations between monitored elements, such as deviation from the required distance between longitudinal moving elements, uneven stretching, rotation or the like.

Yet another technical problem of the disclosure relates to detecting trends of failure modes, for example, a small stain of rust or corrosion in a cable may not endanger a system, but spread of rust or corrosion which may reach an unacceptable level when considered over the entire cable longitudinally and/or perimetrically, may introduce such danger and should therefore be notified. In other examples, the penetration depth of the corrosion may also be considered in addition to its spread.

One technical solution comprises a method and apparatus for automatic monitoring of cables and other longitudinal moving elements during motion. The apparatus may comprise at least an illumination device and an image capture device also referred to as an image sensor, wherein the illumination device may be configured to illuminate at least a part of the field of view of the capture device.

The solution may comprise sensing whether the monitored system, including the moving elements, is in motion. Sensing may be performed in a variety of manners, such as but not limited to receiving an indication from a controller, receiving output from a sensor such as a motion sensor, a vibration sensor, or a magnetic sensor, or receiving one or more images, e.g. a sequence of video frames, of any moving part of the system from an image capture device and determining whether the system is in motion by observing that the image is blurred, or the like.

Once it is determined that the system is in motion, an illumination device may be activated in synchronization with an image capture device, such as but not limited to a video camera capturing a section of the one or more cables. The images are thus captured with sufficient light, are of high resolution, and can be analyzed. The capture device may be in the vicinity of or in sight of the longitudinal moving element or part thereof. In further embodiments, the capture device may be fixed on or in relation to the longitudinal moving element. The illumination device may be operated in a stroboscopic manner, in accordance with the exposure periods of the capture device.

It is appreciated that in order to be operative for illuminating during the exposure time of a frame, capturing the illumination device may be configured to be activated and deactivated in short times, for example less than 1 mSec, less than 10 mSec, less than 20 mSec, or the like.

In some embodiments, the capture device may operate with a rolling shutter. In such embodiments, the stroboscopic light may be configured to operate when all rows of the image sensor of the capture device are open, i.e., after the last row has been opened and before the first row has been closed, such that the full image is captured under illumination.

In some embodiments, the capture device may be capturing the moving elements continuously, with or without synchronized illumination. However, if the monitored system is not in motion or illumination is not activated, the video may be discarded after a predetermined period of time, and only if the illumination device is activated, the video may be stored in non-volatile memory and analyzed. In some embodiments, the apparatus may comprise one or more processors for analyzing the video images. Optionally, the frames taken under illumination may be uploaded or otherwise transmitted to another, optionally remote, computing platform, for analysis.

The images may be analyzed for determining one or more failure modes of the moving elements. In some embodiments, each failure mode may be determined separately, or by a different engine, such as an image analysis engine, a classifier, a change detection engine, an AI engine, or the like, thereby enabling further engines to be added when new failure modes are realized. In some embodiments, the engines may be operated in parallel, sequentially, or the like.

In some embodiments, cables of any type may suffer from structural failure modes, such as break in one or more wires, strands or the core. Further failure modes may relate to changes in the cable pattern, stretching, or the like. Additionally or alternatively, cables of specific types may suffer from specific failure modes. For example, metal cables may suffer from rust, metal or other lubricated cables may suffer from lubrication failure modes, other materials may suffer corrosion, a strap or strap system may suffer from sliding, or the like. Moving elements other than cables may suffer from other failure modes, as exemplified below.

In some embodiments, a winding mechanism of a cable, such as a hoist rescue cable of a helicopter may suffer from problems causing irregular winding or releasing of the cable, which may harm its ability to be released and collected as required, and may also damage the cable itself.

In some embodiments, and in particular when monitoring belts and in particular closed-loop belts such as pulley belts, conveyor belt, or the like, the capture device may capture a part of the belt, wherein the capture device may be adjusted to capture the same part of the belt throughout the exposure time. In some examples, the capture device may be arranged to move in accordance with the belt, such that the relative motion therebetween is zero or minimal thereby providing for a sharp image. In other embodiments, the capture device may be static, but may still capture the same part of the belt, for example by a mirror moving in accordance with the belt and reflecting the same area of the belt to the static capture device.

In some embodiments, the apparatus may be in communication with a controller of the monitored system, and may receive information. For example, the information may include an indication of whether the system is in motion, the location of the system or part thereof, such as the floor, or a location within a floor, in which an elevator is currently at.

In other embodiments, in order to identify whether the monitored system is in motion the apparatus may comprise one or more sensors, such as a magnetic sensor, a motion sensor, or the like. In another example, the apparatus may comprise a second capture device, for capturing images without illumination, and identifying whether the images are blurred or not, wherein blurred images may indicate motion. Determining whether the monitored system is in motion may also be performed by other sensors such as motion sensor, or the like.

While the first option of receiving indications from a controller may be advantageous as it may also report where the monitored system is, the second option of a sensor such as a capture device, a motion sensor, a magnetic sensor, an encoder, or any another sensor provides for a standalone apparatus which may be easier to deploy, and does not require any integration with the monitored system.

The apparatus may keep track of the monitored locations, and distribute the capturing and analysis such that all parts of the monitored elements, for example the full length of the cables are captured and analyzed. In some embodiments, the capturing may be according to a predetermined schedule, for example "capture the cables when the elevator is in floor no. 1", capture the cables when the elevator is in floor no. 2", or the like.

In some embodiments, in order to make sure that the entire cable is monitored, the apparatus may identify a plurality of points or marks along the cable, wherein the points or marks are positioned along the cable in a manner that enables to ensure that the cable is eventually fully captured and analyzed. In further embodiments, the cable being fully captured may be ensured by image registration as detailed below.

The detected faults or failures and their locations may be stored with the respective date and time, and optionally with the relevant information as received from the controller, such that the maximum information is available for analyzing the situation.

The apparatus may be installed in one or more locations in the vicinity of the longitudinal moving elements, such as in the engine room, in an elevator shaft, along the path of a conveyor belt, attached to a static part through which the moving element passes or the like.

In some embodiments two or more apparatuses or at least two or more capture devices may be installed. Since a single capture device may not be able to capture a longitudinal moving element from all directions, an additional one or more capture devices, or a capture device rotating around the longitudinal moving element may be used for capturing parts hidden from the first capture device. The images from all capture devices may be analyzed, thereby detecting faults in corresponding parts of the longitudinal moving element. In some embodiments, the findings from nearby locations as obtained by different capture devices may be integrated. For example, different portions of the same rust stains may be seen in partially overlapping frames, therefore it may be deduced that the extent of the rust is more significant then seen in each frame separately, therefore the rusted area may be monitored more often, or a warning may be issued to a user at an earlier stage. In further embodiments, two or more cameras may be encased in a housing, which may be designed for example as an open ring, so as to surround a longitudinal moving element and thus capture its whole perimeter.

In some embodiments, multiple systems of longitudinal moving elements may be present, for example in a particularly large elevator. In such situations, a plurality of systems in accordance with the disclosure may be operated. The systems may be synchronized, information related to the different longitudinal moving elements systems may be shared, or the like.

In some embodiments, the capture device(s) or a housing comprising the same may be positioned over a moving platform, such that it can move substantially in parallel to the long axis of the longitudinal moving element, and capture different areas thereof, for example its entire length.

In some embodiments, the capture device or a housing comprising the same may be positioned on a device rotating around a longitudinal moving element, to capture its full perimeter. In some embodiments, the housing may comprise a plurality of capture devices capturing simultaneously the full perimeter of the longitudinal moving element.

In either option, i.e., whether a plurality of capture devices are provided, or a capture device rotates around the element, the capture device(s) may be fixed relative to the monitored device and thus capture different parts of the longitudinal moving element when it moves, or move along the longitudinal moving element.

It is appreciated that in embodiments where the images are captured while the moving elements are static, the illumination mechanism may not be required, since the capture device or housing may travel at any required speed. Thus, it can travel slowly enough to ensure capturing of sharp images of the longitudinal moving elements.

One potential technical effect of embodiments of the disclosure is the automatic ongoing monitoring of a monitored system comprising one or more moving elements. The ongoing monitoring may save on unnecessary technical visits, unnecessary part replacement, or other maintenance operations. On the other hand, the ongoing or periodical monitoring which may be more frequent than scheduled technician visits may provide for early detection of faults or developing faults, such that a technician visit may be scheduled early enough without the fault endangering the monitored system or users thereof. The moving elements may be longitudinal moving elements, radial moving elements, closed loops moving elements such as belts, any combination thereof, or the like.

Another potential technical effect of embodiments of the disclosure relates to the fault discovery being more accurate than can be achieved by a human, due to the sharp images enabled by using high resolution camera and illumination if necessary.

The high quality fault detection may also provide for predictive maintenance or health monitoring of devices, as failures may be predicted before occurring, where replacement or repair are easier, and before any further damage is caused.

On the other hand, the accurate detection enabled by identifying the required failure modes also provides for reducing the number of false alarms, thereby enhancing the reliability of the solution.

Another potential technical effect of embodiments of the disclosure is the enablement of checking the monitored system while in motion, thereby avoiding unnecessary downtime. Moreover, the method and apparatus provide for monitoring for faults that may be detected only when the monitored system is in motion, which a human, such as a technician may not always be able to do, due to the fast movement of the longitudinal moving element or the unreachable location of the detected elements during operation.

Another potential technical effect of embodiments of the disclosure is that it is ensured that the entire length and the entire perimeter of a longitudinal moving element are checked for faults, such that no section thereof may comprise undetected faults. Moreover, the faults may be considered in a more wholistic manner over the entire length and perimeter of the longitudinal manner. For example, a plurality of corrosion areas may sum up to cover a significant percentage of the element, even if the size each such area in itself is below a predetermined threshold.

Another potential technical effect of embodiments of the disclosure is that it is applicable to monitoring elements moving in radial motion, such as fans or in repetitive motion such as closed loop belts.

Another potential technical effect of embodiments of the disclosure is that it is applicable to systems having a combination of radial and longitudinal motion, such as a hoist rescue cable of a helicopter, and a winding mechanism for winding the cable around a drum. In such systems, the released cable may be monitored for faults or failures, and the windings may be monitored for misarrangements.

Another potential technical effect of embodiments of the disclosure is that it is applicable to any type of moving elements, such as cables, straps, ropes, belts, fans, or the like, whether it moves linearly, in a closed loop, horizontally, vertically, inclined, radially around a center or any combination thereof, and whether the whole longitudinal moving element moves or one end thereof is attached to a fixed point and the longitudinal moving element rolls and spreads.

Another potential technical effect of embodiments of the disclosure is that the system may monitor for any one or more failure modes that can be detected visually, and is not limited to a specific set of failure modes known at deployment time. The set of faults or failures may vary over time, and different set of failure modes may be searched for in different types of monitored elements.

Another potential technical effect of embodiments of the disclosure relates to detecting faults associated with interrelations between two or more longitudinal moving element, or between different parts of the same longitudinal moving element, such as a change in the distance between longitudinal moving element, overlapping, or the like, which may cause or be caused by further faults in either of the cables or in their interrelationships. Moreover, faults may be detected which are associated with interrelations between a longitudinal moving element and another element.

Another potential technical problem overcome by embodiments of the disclosure relates to detecting trends of faults, such that a developing fault nay be identified which does not necessitate immediate care, but should be monitored over time to follow its development and predict when a corrective action is required.

For example, referring to a certain failure mode, a failure mode realized in one or more images may be quantified. A first threshold of the failure mode may define a fault, while a second threshold of the failure mode, which may be higher than the first threshold, may define a more severe fault or even a failure. The advancement rate of a fault may indicate a trend and predict when the fault may become a failure, such that preventive or corrective measurements can be taken prior to the formation of a fault.

Referring now to FIG. 1, showing an illustration of the main components in an exemplary environment practicing the disclosure, in accordance with some exemplary embodiments of the disclosure.

Longitudinal moving elements such as cables are used in a variety of devices, FIG. 1 shows an exemplary environment 100 of an elevator in which the cables are monitored. The cables are shown as they pass between ceiling 124 and floor 128 of a typical story of the elevator shaft. The cables may include one or more cables, such as cable 104 and cable 108. One end of the cables may connect to the elevator chamber and the other may connect to the counterweight. When the elevator goes from one floor to the other, the counterweight goes the same distance in the opposite direction, wherein this mutual motion is enabled by the cables.

The apparatus may comprise a sensor 118, for sensing motion of the cables. In some embodiments, sensor 118 may be an optical sensor, such as a camera or a video camera. Sensor 118 may include any one or more of a charge-coupled device (CCD), a complementary metal-oxide-semiconductor (CMOS) sensor (or an active-pixel sensor), a photodetector (e.g. IR sensor, visible light senor, UV sensor), a distance measurement sensor such as a Lidar sensor, or any combination thereof. If sensor 118 is implemented as an optical sensor, it may be aimed at, and can capture frame streams or images of sections of one or more cables, such as cable 108. The frames captured by the camera may be stored in a buffer in a temporary memory device. The frames may be deleted after a predetermined time, for example 10 seconds, 30 seconds, one minute, five minutes, or the like.

In other embodiments, sensor 118 may be a magnetic sensor that can sense changes in a magnetic field, a vibration sensor than can sense that the cables are moving, or any other sensor than can provide motion indication.

The apparatus may further comprise an illumination device 116, such as a light emitting diode (LED), or any other light source emitting visible, InfraRed (IR), near IR, UV or light in any other range. Illumination device 116 may be positioned and configured such that it illuminates all or a part of the field of view of a capture device 120. Illumination device 116 may be adapted to emit short stroboscopic pulses of light, such that frames captured by capture device 120 under this illumination are sharp. In some embodiments, capture device 120 may include any one or more of a charge-coupled device (CCD), a complementary metal-oxide-semiconductor (CMOS) sensor (or an active-pixel sensor), a point sensor, a distributed sensor, an extrinsic sensor, an intrinsic sensor, a through beam sensor, a diffuse reflective sensor, a retro-reflective sensor, or any combination thereof. In some embodiments, capture device 120 may include one or more lenses and/or a fiber optic sensor. While FIG. 1 shows illumination device 116 separately from capture device 120, it is appreciated that in some embodiments illumination device 116 and capture device 120 may be implemented within the same housing.

It is appreciated that capture device 120 may be configured to sense light, including light in the range emitted by illumination device 116, whether the emitted light is visible to the human eye or not. For example, some sparks that need to be sensed by capture device 120 may be in the UV range. In some embodiments, one or more lenses of capture device 120 may include suitable coating for receiving the emitted light.

It is also appreciated that if capture device 118 comprises an image sensor, it may be configured to sense the relevant wavelengths that may be required for sensing motion.

In some embodiments, if sensor 118 is implemented as a capture device, one or more frames captured by sensor 118 may be analyzed for sharpness. If the frame is not sharp but blurry, this may indicate that the monitored system, e.g., the elevator is in motion and the cables are moving.

In some embodiments, computing platform 114 may be in communication with a controller of the monitored system, such as a controller of the elevator. The controller may provide to the computing platform details about the status and operation of the monitored system. For example, in the case of the elevator the controller may provide information as to whether the elevator is in motion.

If it is determined, by any implementation of sensor 118 or by communication with the controller, that the cables are moving, illumination device 116 may be activated in synchronization with capture device 120 to capture frames depicting segments of the cables during motion. In other embodiments, the illumination may emit light strobes in synchronization with capture device 120 regardless of the motion of the monitored system, but unless the system is moving, the images may be discarded. If the system is in motion, the frames may be analyzed and may also be copied to a non-volatile location and analyzed for one or more faulty situations.

In some embodiments, the apparatus may comprise one or more computing platforms 114, located on-premise or remotely, and in wired or wireless communication with illumination device 116 and capture device 120. For example, computing platforms 114 can be connected to capture device 120 and illumination device 116 through wires running through structure 112.

In some embodiments, the apparatus may comprise a controller, which may or may not be part of computing platform 114, and which synchronizes the emittance of the illumination pulses by illumination device 116 with the frame rate and/or the exposure time of illumination device 116, such that light is emitted when capture device 120 is capturing images.

It is appreciated that capture device 120 may operate in the global shutter method, or in the rolling shutter method. In the rolling shutter method, the light pulse emitted by illumination device 116 may be synchronized with the time frame where the maximal or similar number of sensor rows are being exposed.

In some embodiments, the controller of the monitored system, such as a controller of the elevator may also provide additional information on the status of the system such as in the case of an elevator, information regarding in which floor the elevator is, which floor it is going to, whether the doors are open or close, the speed of the elevator, or the like. The information about the elevator location enables to ensure that all sections of the length of the cables are captured and analyzed within a certain time frame, for example every week, every two weeks, every month, or the like.

In some embodiments, the additional information may be used as an additional input to one or more of the fault detecting engines, for example the AI engines, adapted for detecting one or more faults in a captured image.

In some embodiments, the location of the monitored device such as the elevator may be used for sampling the cable and providing statistical significance to the monitoring results.

In some embodiments, computing platform 114 may determine the shutter speed of capture device 120 or the width and frequency of the illumination pulses of illumination device 116, in accordance with the motion speed of cable 108, as predetermined, received from the controller, analyzed from previously captured images, or the like.

Figure 2:
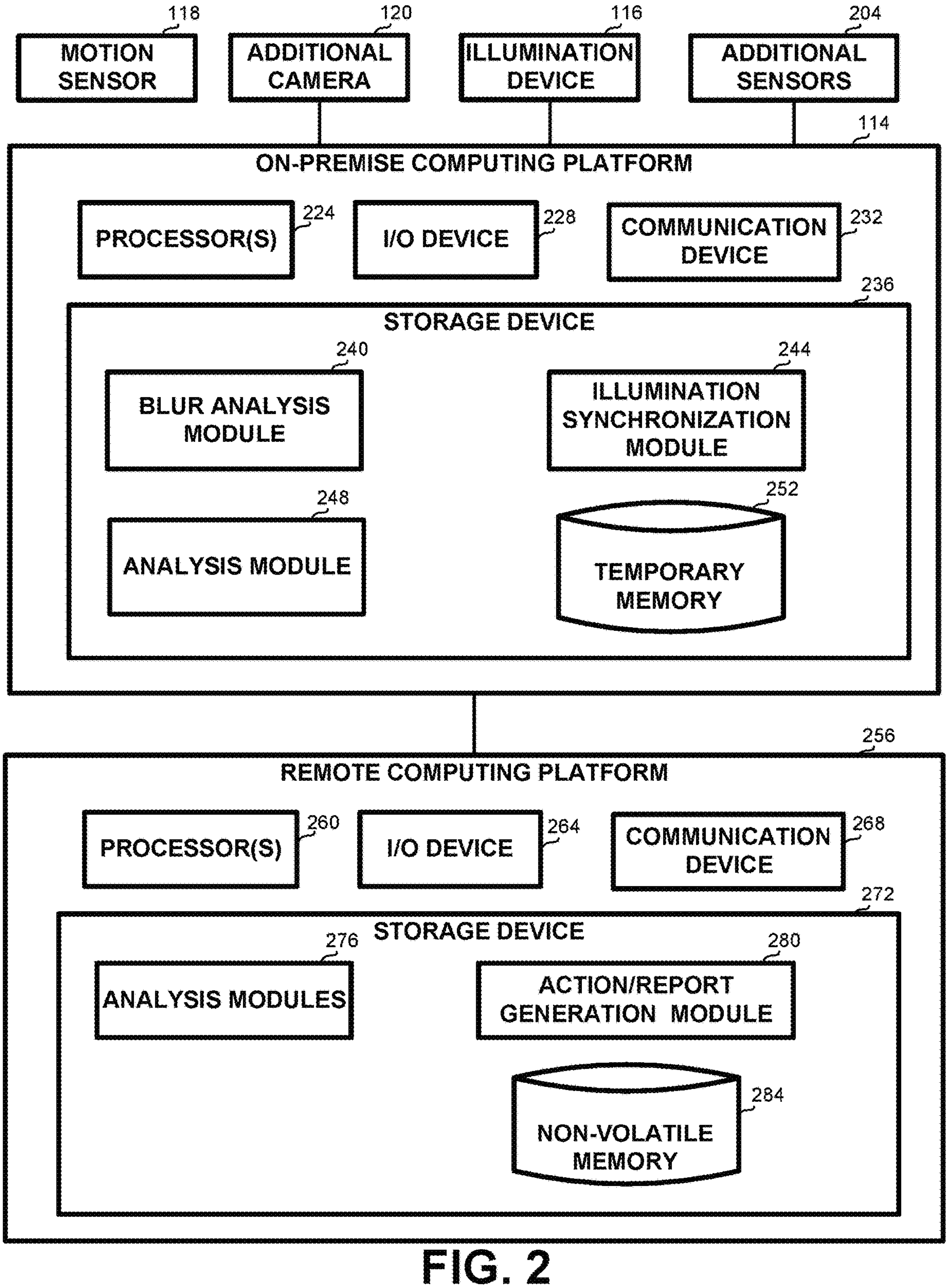
FIG. 2 is a schematic block diagram of a computing platforms associated with an apparatus, in accordance with some exemplary embodiments of the disclosure.

Referring now to FIG. 2, showing a schematic block diagram of the computing platforms associated with an apparatus, in accordance with some exemplary embodiments of the disclosure.

The apparatus may comprise motion sensor 118 and illumination device 116. In some embodiments, the apparatus may also comprise a capture device 120, as described above.

The apparatus may comprise on-premise computing platform 114. Computing platform 114 may be implemented as one or more computing platforms collocated or distributed, which may be in communication with one another. In some embodiments, output of motion sensor 118, e.g., indications of motion may be provided to computing platform 114 or to a controller, such that illumination device 116 and/or capture device 120 may be operated.

The apparatus may comprise additional sensors 204, such as a pressure sensor, temperature sensor, InfraRed sensor, a voice sensor or the like for providing additional input on the health of the monitored system which can be combined with the analyzed detections from the capture device to provide complete health monitoring of a machine.

Computing platform 114 may comprise one or more processors 224 which may be one or more Central Processing Unit (CPU), a Graphic Processing Unit (GPU), a Tensor Processing Unit (TPU), a microprocessor, an electronic circuit, an Integrated Circuit (IC) or the like. Processors 224 may be configured to provide the required functionality, for example by loading to memory and activating the modules stored on storage device 236 detailed below.

Computing platform 114 may also comprise Input/Output (I/O) device 228 such as a display, a pointing device, a keyboard, a touch screen, a General Purpose Input/Output (GPIO) or the like. I/O device 228 may be utilized to receive input from and provide output to a user, for example set parameters of the apparatus, receive indications that the apparatus is operative, receive indications to detected faults, or the like.

Computing platform 114 may comprise communication device 232 for communicating with other devices or computing platforms, for example a controller of the monitored system, a remote computing platform, or the like, via any communication channel, such as a cellular network, Wide Area Network, a Local Area Network, intranet, Internet or the like.

Computing platform 114 may also comprise a storage device 236, such as a hard disk drive, a Flash disk, a Random Access Memory (RAM), a memory chip, or the like. Storage device 236 may also be distributed among two or more platforms, stored on cloud storage, or the like.

In some exemplary embodiments, storage device 236 may retain program code operative to cause processor(s) 224 to perform acts associated with any of the modules listed below or steps of the method of FIG. 3A or FIG. 3G below. The program code may comprise one or more executable units, such as modules, functions, libraries, standalone programs or the like, adapted to execute instructions as detailed below.

Storage device 236 may store blur analysis module 240, which if sensor 118 is a camera, may analyze the captured images to determine whether they are sharp or blurry.

Storage device 236 may store illumination synchronization module 244 for optionally determining the pulse rate and pulse width and frequency and wavelength of illumination device 116, and synchronizing it with capture device 120. However, in some embodiments these parameters may be determined during deployment, such that illumination synchronization module 244 may be omitted.

Storage device 236 may store analysis module 248, for analyzing frames captured by capture device 120. However, in some embodiments, the analysis of these frames may be performed by another computing platform, for example by analysis modules 276 of remote computing platform 256, as detailed below. Analysis module 248 may be operative in determining which part or parts of the longitudinal moving element is monitored or is to be monitored. In some embodiments, analysis module 248 may be in communication with or may otherwise receive input from a controller of the monitored system. Analysis module 248 may be further operative in determining whether the full length of the determined part has been captured and analyzed. Analysis module 248, if present, may comprise a plurality of engines, wherein each engine may be adapted to detect the occurrence of a specific failure mode in the longitudinal moving element.

Storage device 236 may store temporary memory 252 for storing frames obtained by capture device 120. If the frames are taken under illumination and/or when the monitored system or the camera are in motion, they may or may not be analyzed while in temporary memory 252, and or/be moved or copied to another computing platform for further analysis.

Computing platform 114 may be in communication with remote computing platform 256. Providing captured images or other information and/or performing analyses on a remote computing platform may be advantageous in that data from a plurality of systems associated with one or more users, may be collected and used for training or otherwise learning, thereby enhancing the performance of the plurality of systems.

Remote computing platform 256 may comprise one or more processors 260, I/O device 264, communication device 268, and storage device 272, similar to processor 224, I/O device 228, communication device 232 and storage device 236 of computing platform 114.

Storage device 272 may store analysis modules 276. Analysis modules 276 may perform some of the analyses detailed in association with analysis module 248. Analysis module 276 may comprise one or more engines adapted to detect the occurrence of a specific type of fault within one or more frames.

Analysis module 276 and/or analysis module 248 may also be operative in determining which parts of the monitored longitudinal moving element have been captured and analyzed.

In some embodiments, determining the part may first comprise determining a global location that needs to be captured or is being captured, such as the part of the longitudinal moving element that is opposite the system when an elevator is on a specific floor or between two specific consecutive floors. Such information may be received, for example, from a controller of an elevator.

Then, on a more local level, the frames captured when the elevator was in that location may be analyzed for making sure that the full length of the part of the longitudinal moving element has been monitored. Determining the part of the longitudinal moving element may be performed by recognizing specific marks on the longitudinal moving element and identifying the marks in further frames, wherein the marks are spaced apart such that it can be determined which part of the longitudinal moving element is captured. In a non-limiting example, if the marks are spaced such that with the given speed of the longitudinal moving element and frame rate, each frame contains at least one mark, and/or that two marks can be seen in one frame, it can be determined whether the part of the longitudinal moving element has been fully captured. The marks may be color marks, special pattern of the wires, an added wire, or any other visual or structural mark. It is appreciated that marks may also be provided on the perimeter of the element, in order to make sure that the full perimeter of the element is captured and analyzed. It is appreciated that marks may also be provided and analyzed for monitoring a specific anomaly. In some embodiments, it may be determined that the full length of the cable has been monitored using marks, without receiving specific information for example from an elevator controller.

In some embodiments, a registration process between immediately or non-immediately consecutive images may be applied in order to determine whether the full length of the moving element has been captured, and to track issues, such as rust development, in a specific segment. In some embodiments, the longitudinal moving element may not carry any marks, and the coverage may be determined by identifying segments of the longitudinal moving element. Registration may involve analyzing the frames and identifying one or more small segments of the element, such as segments of 6×6 or 12×12 pixels. In some embodiments, a hash value may be calculated for each such segment and associated with the segment. The segments may then be searched for in further frames by comparing the hash values. In some embodiments, registration may be facilitated by the known elevator location, movement direction, speed of the longitudinal moving element, and the frame rate. Thus, registration and tracking of the sections provides for indicating sections of the longitudinal moving element as having been reviewed.

In some embodiments, registration may also refer to identifying an object or location in an image based on comparison to predefined object or location rather than comparison to a preceding or subsequent image. Identifying the location or object in the image by comparison to a predefined object or location may enable for verifying that the object and optionally its surrounding are captured and may be analyzed.

Collecting the information about the reviewed sections of the longitudinal moving element may provide for keeping track of which parts of the longitudinal moving element have been reviewed and when, thereby ensuring that the whole length of the longitudinal moving element has been reviewed, for example within a predetermined period of time. Additionally or alternatively, keeping track of specific segments enables to monitor the segments for specific faults or possible faults thereof over time, predict their status and ensure that they are handled in due time.

Storage device 272 may store action/report generation module 280 for generating a report related to one or more frames, to frames analyzed over a period of time, or the like. If one or more faults are detected or suspected, action/report generation module 280 may take an action such as sending a message or a report to a person in charge, stopping the monitored system in severe cases, automatically scheduling a technician visit, or the like. A report may relate to a detected fault, to a trend of fault indicating the rate of advancement of a fault when maintenance is suggested, indicate a location of a fault or which of the longitudinal moving element needs to be replaced, or the like. A report may also include one or more images demonstrating a fault or failure mode. A report may further comprise a failure trend, i.e., a prediction of when the fault will develop into a failure, based on the fault or failure mode, previous analysis or input and optionally environmental parameters.

Storage device 272 may comprise non-volatile memory 284 for storing frames received from computing platform 114 and analyzed for fault detection.

Figure 3A:
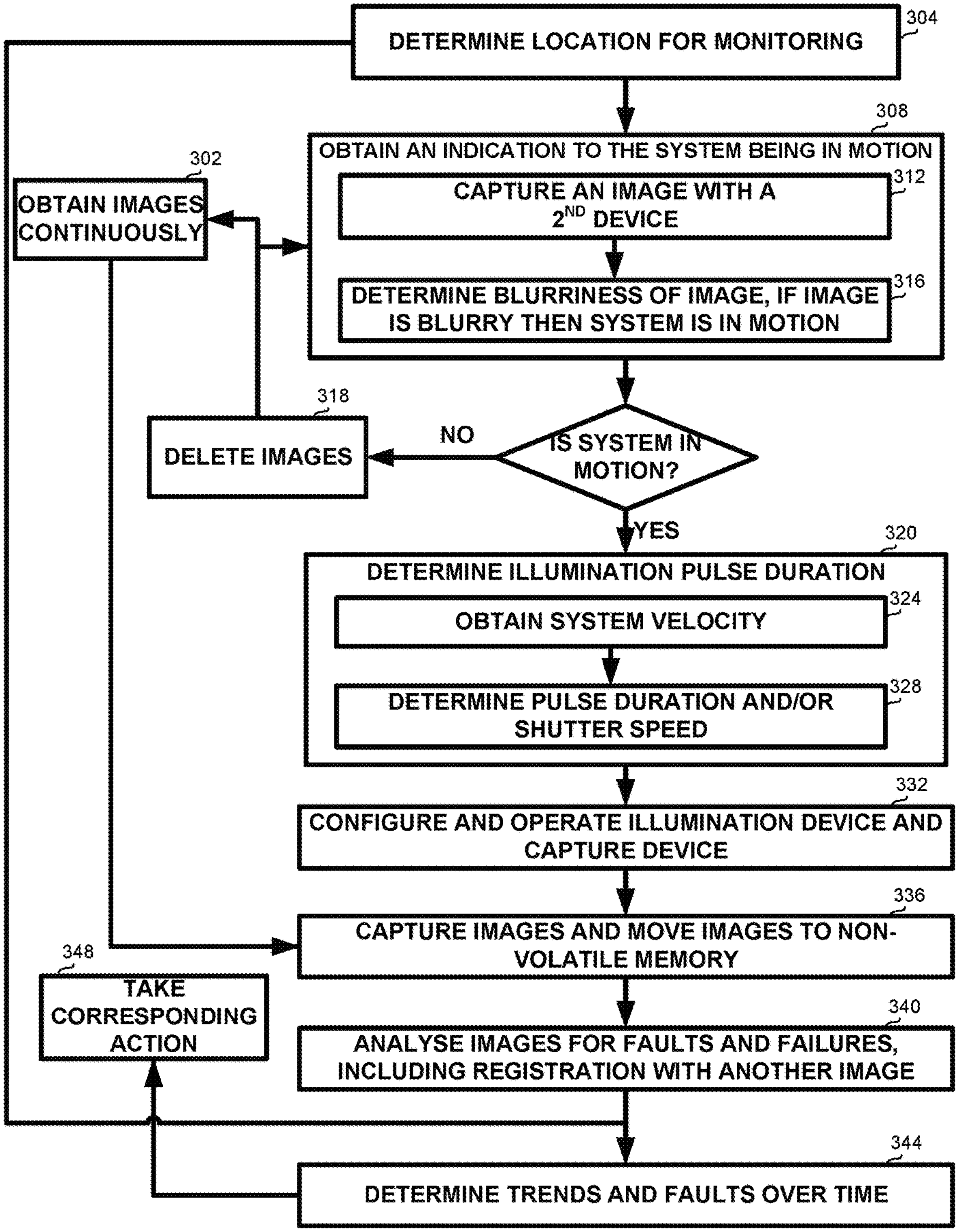
FIG. 3A is a flowchart of steps in a method for detecting faults in a longitudinal moving element, in accordance with some exemplary embodiments of the disclosure.

Referring now to FIG. 3A, showing a general flowchart of steps in a method for detecting faults in a longitudinal element, in accordance with some exemplary embodiments of the disclosure.

On step 304, it may be determined by a processor which section of the longitudinal element, such as a cable is to be captured and monitored. The part to be captured may be determined randomly and awaited until capturing thereof is enabled by the monitored system being at the required location. In other embodiments, when the monitored system arrives at a location it may be determined whether this location needs to be monitored. In further embodiments, the location to be monitored may be determined in accordance with a schedule intended to cover all parts of the longitudinal moving element within a predetermined time duration. It is appreciated that further methods for determining the section to be monitored may exist, as well as combinations of such methods. In further embodiments, monitoring may be continuous, time-based for example only during office hours in an office building, or the like.

In some embodiments, the full length of the moving element needs to be monitored within a predetermined time frame. In a non-limiting example, the technician visits to an elevator may be scheduled every month, and it may be sufficient to review each section of the elevator cables twice between any two such visits. In another non-limiting example, technician visits are scheduled only upon calls, such that it may be advantageous to call the technician upon the detection of a fault or failure. Thus, for example when a certain section is determined to be reviewed, if it has been reviewed twice since the last technician visit, reviewing the section again may be skipped. At predetermined times, for example a predetermined time before halfway to the next technician visit, or a predetermined time before the next technician visit, it may be determined which sections of the elevator cable have not been sufficiently monitored and it may be purposely aimed to monitor these sections. For example, the next time the monitored system is at a location appropriate for monitoring such segment, monitoring may be activated. Thus, it may be ensured that all parts of the moving element have been captured and analyzed within a specified timeframe.

In some embodiments, a collection of sections that need to be reviewed may be maintained, and if the monitored system is at a location that enables monitoring of such section, the section may be captured, analyzed, and removed from the collection.

On step 308, it may be determined whether the monitored system is in motion or static. In some embodiments, an indication thereof may be received, for example from a controller of the monitored system, such as a controller of an elevator. Optionally, the controller may also provide an indication of the location of another part of the monitored system, such as the elevator chamber, from which the section of the cable to be captured may be derived. In some embodiments, the indication may also comprise the section of the cable that is in the field of view of the static camera.

In some embodiments, for example when the apparatus is standalone and does not receive information from a controller or another source, determining whether the monitored system is in motion may be performed by a motion sensor. One example of a motion sensor can be the use of a camera as follows:

On step 312, an image of the part of the longitudinal moving element which is in the field of view of a capture device may be taken. The capture device may be a still camera, a video camera, or the like. Optionally the camera is the same as the capture device used for motion detection.

On step 316, the captured image may be analyzed to determine whether the image is blurry. In some embodiments, the blurriness may be evaluated by the "smearing" of the image. In some embodiments, the blurriness may be evaluated by a trained engine, such as a classifier. The classifier may be trained upon a plurality of blurry images and a plurality of sharp images, each associated with a corresponding label. Then when an image is provided to the engine, it may output whether the image is blurry or sharp. In some embodiments, the engine may receive a label comprising a blurriness degree, and may output a prediction of such degree, for example between 0 and 100. If the image is blurry, for example the blurriness degree is above a predetermined threshold, then it may be deduced that the monitored system is in motion, and vice versa.

If it is determined that the monitored system is static and does not move, the images may be deleted on step 318, capturing may continue on step 302, and obtaining the moving indication may continue on step 308.

In some embodiments, the sharp images captured by the second camera may be analyzed as described in association with step 336 below, in addition to the images taken by the capture device under illumination.

However, if the system is in motion, then on step 320, the illumination pulse duration may be determined, unless set during system deployment, or upon need if a change occurs.

In some embodiments, the illumination pulse duration may be predetermined, for example at deployment time, based on the location of the capture device relative to the longitudinal moving element, the exposure time of the shutter of the capture device, the velocity of the longitudinal moving element if it is constant for relatively long periods of time, or the like. The illumination pulse duration may be predetermined to be as long as possible, but shorter than the exposure time of the shutter of the capture device.

In other embodiments, the illumination pulse duration may be determined as follows:

On step 324 the velocity of the monitored system, and in particular the velocity at which the longitudinal moving element is moving may be obtained, for example from the controller. In further embodiments, the velocity may be obtained from the difference in the location of an identified section, mark, object or artifact appearing in two or more consecutive frames.

On step 328, using the velocity, the illumination pulse duration and/or the exposure time of the shutter of the capture device may be determined as detailed in association with FIG. 3C below.

Once the capturing parameters are determined, on step 332 the illumination device and/or the capture device may be configured accordingly, and may be synchronized with each other.

It is appreciated that in some embodiments step 302 is performed continuously and the video camera keeps capturing frames, regardless of whether the illumination device is active or not.

Thus, once the illumination device is active and sharper images are captured, on step 336 images may be taken during the illumination pulses. Capturing may include receiving one or more signals from a capture device. According to some embodiments, the one or more signals may include one or more images. According to some embodiments, the one or more signals may include one or more portions of an image. According to some embodiments, the one or more signals may include a set of images, such as a packet of images. According to some embodiments, the one or more signals may include one or more videos.

In some embodiments, the one or more images or parts thereof may be transmitted to a non-volatile memory device. The non-volatile memory device may be part of or associated with the computing platform, or remote, for example an on-premise server, a remote server, a cloud storage, or the like.

On step 340 the images may be analyzed for faults of one or more failure modes, for example by an on-premise computing platform, by a remote computing platform, or the like. Analysis may include checking for the existence of a plurality of faults, as detailed below.

Analysis of the images may also comprise determining that no part of the monitored section has been left unanalyzed. In some embodiments, the system may detect marks bared on the longitudinal moving element, such that by ensuring that all marks have been captured and the respective images had been analyzed, it is ensured that the full length of the longitudinal moving element section has been reviewed.

In other embodiments, one or more segments of the longitudinal moving element may be identified and searched for in consecutive frames, to ensure continuity of the review. Searching may comprise registration, for example by assigning a hash value to one or more segments in an image, and searching for other areas having the same hash value in one or more consecutive frames.

Registration with images depicting partially overlapping areas enables to determine a more comprehensive view of a failure mode, for example how expansive the failure mode is, beyond the current image. Additionally or alternatively, registration may provide for determining the exact location of the captured area for comparison with past or future images and realizing trends of the failure mode.

In further embodiments, in order to ensure that each point on the cable is monitored at least once over a predefined period of time, a statistical model may be used. The relationships between the cable velocity, pulsed light frequency and number of monitoring repetitions that need to be performed to ensure monitoring the cable's entire length may be presented as follows:

$$L_f = 2 * D * tg(FOV/2),$$

wherein:

D denotes the distance of the capturing sensor from the cable;

FOV denotes the camera's Field of View; and $L_f$ denotes the length of the cable captured in a single frame.

For example, assuming the duration of the pulsed light is very short and simulates a fixed cable (i.e., the cable does not move while it is lit), in a camera with a 70° FOV located 100 mm from the cable. The equation will be:

$$L_f = 2 * 100 * tg(35^0) = 140 \text{ mm}$$

meaning that during one frame a section of 140 mm of the cable is captured. To calculate the distance the cable moves between the duration of the pulsed light the following formulas may be used:

$$P = 1/F * V$$

$$B_a = P - L_f$$

Wherein:

V denotes the velocity of the cable;

F denotes the pulsed light frequency, which is equal to the optical sensor frame per second (FPS) rate;

P denotes the distance the cable moves during the cycle time of one frame; and $B_a$ denotes the blind area, i.e., the length of the cable that is not captured between two consecutive pulses of light.

It is appreciated that the faults, failures, failure modes, trends may be output to a user, for example by updating a database, sending a message, displaying a message on a display device, issuing a vocal alert, or the like. Additionally, output indicating that the monitored element is operative an no problems have ben detected may also be provided.

Figure 3B:
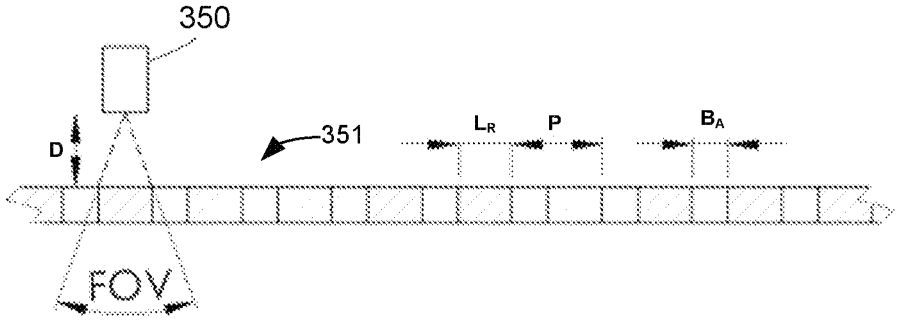
FIG. 3B is a schematic illustration of an environment in which it is required to calculate a blind area of an image sensor, in accordance with some exemplary embodiments of the disclosure.

Referring now to FIG. 3B, showing a schematic illustration of an environment in which it is required to calculate the blind area of the sensor, in order to determine the time required for ensuring that all parts of the cable are captured and analyzed.

The environment comprises optical sensor 350 located at a distance D from cable 351. The cable moves a distance of P in a single cycle of sensor 350, and a part of the cable having a length $L_f$ is captured in a single frame. The FOV is as indicated, and a calculated FOV and blind spot (Bl), according to some embodiments of the disclosure.

In an example, for a 30 FPS camera, $L_f$ of 140 mm and cable velocity of 10 m/sec:

$$B_a = 1/30 * 10{,}000 - 140 = 193 \text{ mm}$$

It is appreciated that the smaller the blind spot between the frames, the lower the number of repetitions that must be performed to ensure at least to a predetermined confidence level that the entire cable length is captured.

To reduce the length of the blind spot (and thus the number of repetitions), the pulsed light frequency or the pulse width needs to be increased. It is appreciated that the pulse width can be increased within the limitations incurred by the cable speed, since a too wide pulse will produce a blurred image. Additionally or alternatively, the blind spot can also be reduced by increasing the area captured in the frame, which can be achieved by increasing the FOV or increasing the distance of the camera from the cable. It is however appreciated, that this may have a negative effect on the resolution, such that the tradeoff needs to be considered.

In order to calculate the illumination pulse width, the following factors are considered or combined with few factors: the cable speed, the sensor resolution and the FOV.

Contrary to the simplistic assumption above, when using illumination pulses, a captured object will move during the illumination period. For overcoming the motion blur effect, it needs to be determined how much the object is allowed to move. Stated simply, the object can move within a single pixel during the illumination period.

For that purpose, the real life pixel size needs to be calculated. For example, the FOV of a 200×200 resolution sensor is such that it enables the capturing of an area sized 1 m×1 m, and since the movement is generally along one dimension, it is referred to as 1 m. The minimum distance that the object can move is thus 1 m/200=0.005 m. If the cable moves in velocity of 30 m/s, the pulse time can be calculated by: 0.005 m/30 m/s=166 micro seconds.

The calculations above can be combined into a single formula:

$$\text{Pulse length(s)} = (FOV\text{(m)/Resolution(}pix\text{)/cable speed(m)}$$

However, this formula is applicable to single pixel moving objects, e.g., defects sized one pixel at the most. In machine vision, in order to ensure accurate and reliable detection of an object of interest, such as a defect, the sensor resolution may be designed such that the object size will be of least three pixels. Therefore, the object will have two pixels of distance movement during the illumination period. The formula can therefore be adjusted as follow:

$$\text{Pulse length(s)} = (FOV\text{(m)}/(\text{Resolution(}pix\text{)}/2))/\text{cable speed(m)}$$

In the current example: 1 (m)/(200/2)=0.01 m, and 0.01 m/30 (m/s)=333 microseconds. Thus, when the system is as described above, pulse length of 333 microseconds, ensures that an object such as a defect is contained within three pixels and thus the motion blur effect can be overcome and the defect can be analyzed.

Thus, when the system parameters, including the cable velocity are known, the optical sensor FPS costs, lighting power, and monitoring quality and duration can be optimized.

The pulse frequency may be coordinated with the frame rate of the capture device, and the illumination time can be the longest possible duration which ensures sharp images and is also equal to or shorter than the shutter exposure time of the capture.

It is appreciated that the computations above may be performed for every frame, every predetermined number of frames, or periodically for example every day, every week or every month. In further embodiments, the computation may be performed once during deployment of the system, or after the configuration of the apparatus or the monitored system is changed.

In some embodiments, the optical capture device may operate with the global shutter method, wherein all pixels of the sensor are opened and closed at the same time. However, capture devices that operate with the rolling shutter method are more available and significantly cheaper, and may thus be preferred in a variety of applications. Since the rolling shutter may introduce distortions which may be caused by the different time at which the pixels are exposed, a processor of the capture device may execute code configured to correct the distortions in the captured images.

Figure 3C:
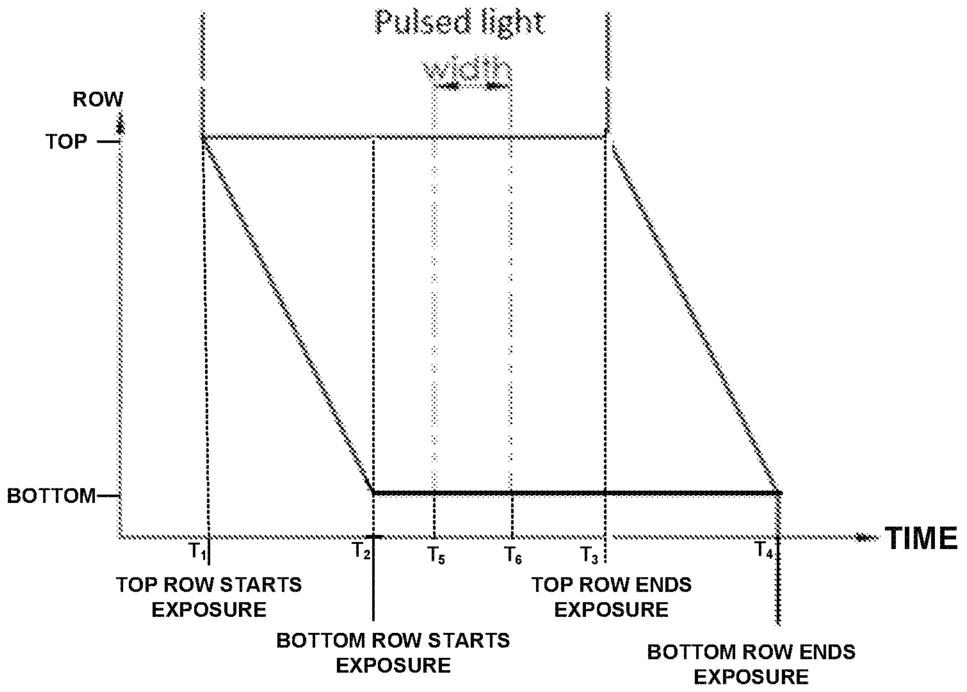
FIG. 3C is a schematic demonstration of the time limitations of pulsed light when a capture device with a rolling shutter is used, in accordance with some exemplary embodiments of the disclosure.

Referring now to FIG. 3C, demonstrating the time limitations of the pulsed light when a capture device with a rolling shutter is used, in accordance with some exemplary embodiments of the disclosure.

In the rolling shutter technology, pixels of a first row (or column) of the sensor, for example the topmost row are opened at time $T_1$, followed by pixels of the second row (or column) being opened, and so on until pixels of the last row being opened at time $T_2$. Then the pixels of the first row are closed at time $T_3$, followed by closing the pixels of the second row, and so on until the pixels of the last row are closed at time $T_4$.

Thus, the pulsed light should start on or after $T_2$ and end on or before $T_3$, when all the pixels are open. This limitation is combined with the computation above of the maximal pulse width that enables capturing sharp images. Therefore, the selected pulse length should comply with the two conditions.

In some embodiments, in order to obtain a sharp image, the optical capture device may move in a manner corresponding to the cable movement, thereby minimizing relative motion therebetween and ensuring sharp images and capturing the same area during the exposure time. Depending on the specific structure and the available space, mechanical complexes may be implemented in a variety of manners for enabling capturing of elements moving in high speed. It is appreciated that having the capture device capture the same portion of the cable throughout the exposure time of a frame, provides for a sharp image and may enable to give up the usage of illumination such as strobing light. It is further appreciated that the capture device moving or otherwise capturing the same portion of the cable relates to one or more images. However, the common motion of the capture device or another element with the cable is intermittent, and further images the capture device will capture other portion of the cable, Referring now to FIG. 3D, showing a schematic illustration of a first embodiment of a capture device moving with a monitored element such as a pulley belt, in accordance with some exemplary embodiments of the disclosure.

Figure 3D:
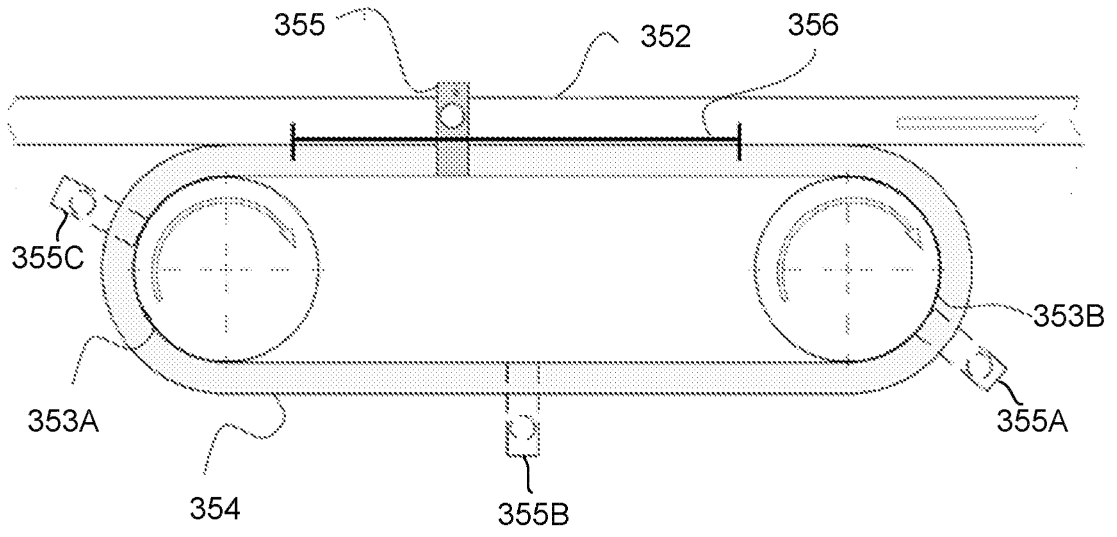
FIG. 3D shows a schematic illustration of a first embodiment of a capture device moving with a pulley belt, in accordance with some exemplary embodiments of the disclosure.

In the example of FIG. 3D, a mechanical system is located adjacent to a belt 352 and is configured to move an optical sensor 355 in parallel to belt 352, during at least a part of the movement of belt 352, and in a speed which is essentially equal to the velocity of the cable. The system includes two pulleys 353A/353B (collectively referred to herein as pulleys 353) which are connected through cable 354 to which optical sensor 355 is attached. In an example, the FPS rate of optical sensor 355 is 30, and the shutter exposure time is $1/(30\times2)=1/60$. The speed of the cable is known to be 5 m/sec, as provided for example by receiving data from a controller, or by analyzing the images received from optical sensor 355 and calculating the cable velocity using image processing techniques. In this case, the calculation of which length of cable passes during one frame is: $5\times(1/60)\times1000=83.3$ mm. Thus belt 352 passes 83.3 mm in one frame, which means that the FPS rate of optical sensor 355 when optical sensor 355 is too low to capture the cable moving in a speed of 5 m/s.

To overcome this problem, pulleys 353 to which optical sensor 355 is attached, move the optical sensor in parallel to belt 352 along segment 356 thereof in speed of 5 m/s which is equal to the cable speed, thereby enabling optical sensor 355 to capture sharp images of the same segment 356 of belt 352 while moving.

A belt 354 keeps moving, optical sensor 355 departs from moving in parallel to belt 352, encircles pulleys 353 as shown in locations 355A, 355B and 355 C, and rejoins belt 352 to capture another segment 356 thereof.

In some embodiments, when capturing the images of belt 352 and in particular segment 356 thereof by the optical sensor 355 while being moved, segment 356 may be illuminated by an illumination source such as a stroboscopic illumination source.

Figure 3E:
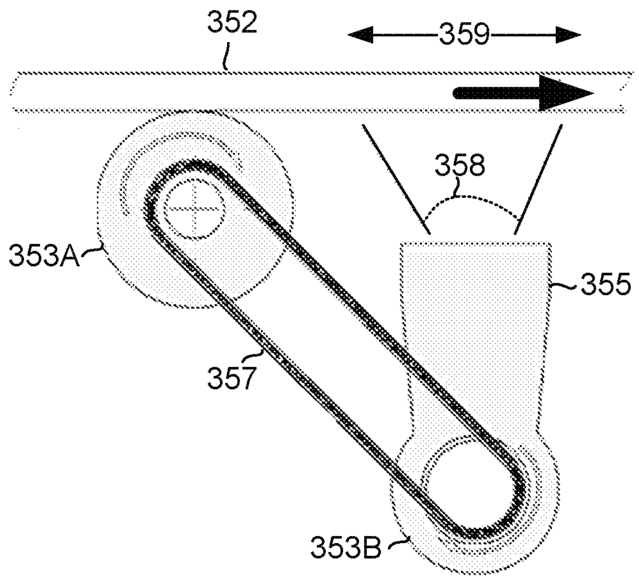
FIG. 3E shows a schematic illustration of a second embodiment of a capture device moving with a pulley belt, in accordance with some exemplary embodiments of the disclosure.

Referring now to FIG. 3E, showing a schematic illustration of a second embodiment of a capture device moving with a monitored element such as a pulley belt, in accordance with some exemplary embodiments of the disclosure.

In the system shown in FIG. 3E, pulley 353A is coupled to and turns around when belt 352 moves, in the same velocity. Pulley 353A, through belt 357, turns around pulley 353B, having coupled thereto capture device 355.

Thus, when belt 352 moves, capture device 355 turns around. Capture device 355 may be operated when it is at an angle in which it captures at least a part of segment 359 that corresponds to section 358. Alternatively, capture device 355 may be operated continuously, but the pictures captured when other directions may be disregarded.

In some embodiments, when capturing the images of belt 352 and in particular when capture device 355 is aimed at section 358, corresponding segment 359 may be illuminated by an illumination source such as a stroboscopic illumination source.

In further embodiments, the camera may capture the same area over the exposure period without moving, but with the use of optical elements such as a mirror that reflects the same area.

Figure 3F:
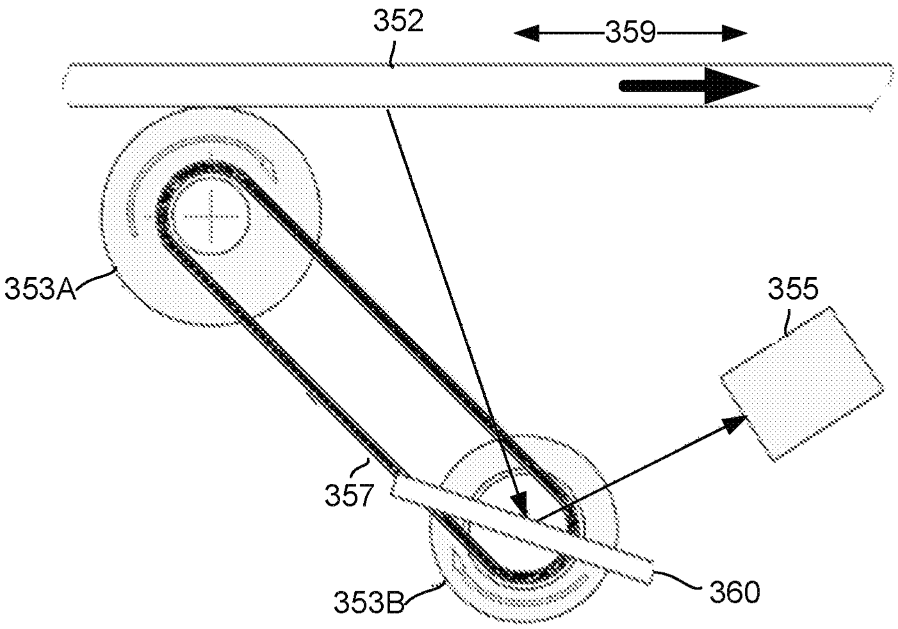
FIG. 3F shows a schematic illustration of a third embodiment of a capture device moving with a pulley belt, in accordance with some exemplary embodiments of the disclosure.

Referring now to FIG. 3F, showing a schematic illustration of a third embodiment of a capture device moving with a monitored element such as a cable, in accordance with some exemplary embodiments of the disclosure.

In the system shown in FIG. 3F, pulley 353A is coupled to and turns around when belt 352 moves, in the same velocity. Pulley 353A, through cable 357, turns around pulley 353B, having coupled thereto a mirror 360.

Thus, when belt 352 moves, mirror 360 turns around. On parts of its circular path, mirror 360 assumes angles in which it reflects parts of belt 352 to capture device 355. Capture device 355 may be operated when mirror 360 is at this angle range. Alternatively, capture device 355 may be operated continuously, but the pictures captured when mirror 360 is at other directions may be disregarded.

In some embodiments, when capturing the images of belt 352, at least when capture device 355 captures parts of belt 352, the corresponding segment of belt 352 may be illuminated by an illumination source such as a stroboscopic illumination source.

Figure 3G:
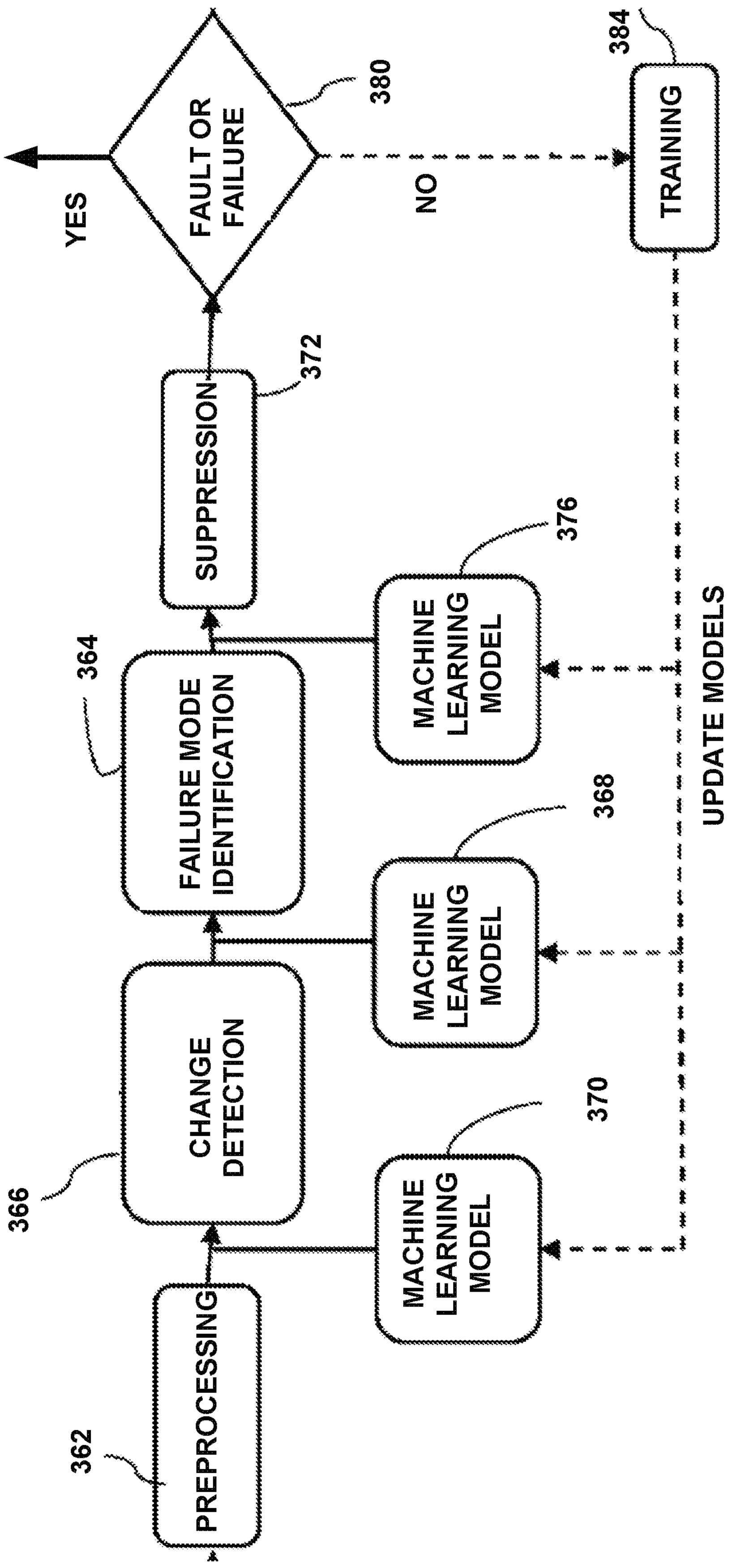
FIG. 3G shows a flowchart of steps in an exemplary method for analyzing an image for faults or failures, in accordance with some exemplary embodiments of the disclosure.

Referring now to FIG. 3G, showing a flowchart of an exemplary method for analyzing an image for faults or failures, in accordance with some exemplary embodiments of the disclosure.

Once an image is received, for example from a capture device as described above, it may undergo step of preprocessing 362. According to some embodiments, preprocessing step 362 may include generating one or more images, one or more sets of images, and/or one or more videos. According to some embodiments, preprocessing step 362 may include dividing the one or more images, one or more portions of the one or more images, one or more sets of images, and/or one or more videos, into a plurality of tiles. According to some embodiments, preprocessing step 362 may include applying one or more filters, such as but not limited to noise reduction filters to the one or more images, one or more portions of the one or more images, one or more sets of images, one or more videos, and/or a plurality of tiles.

On step 366, at least one change may be identified in the received signals and/or at least one identified segment. According to some embodiments, the method may include applying a change detection algorithm to the received images.

According to some embodiments, identifying at least one change in the images includes identifying a change in the rate of change in the images. For example, the algorithm may be configured to identify a change that occurs periodically within the analyzed images of a same location, then the analyzed signals may "return" to the previous state (e.g., prior to the change in the analyzed signals). According to some embodiments, the algorithm may be configured to identify a change in the rate of occurrence of the identified change.

According to some embodiments, identifying the at least one change in the analyzed signals may include analyzing raw data of the received signals or the images or portions thereof or videos obtained therefrom.

According to some embodiments, change detection 366 may include any one or more of a binary change detection, a quantitative change detection, and a qualitative change detection.

According to some embodiments, the binary change detection may include an algorithm configured to classify the analyzed signals or images as having a change or not having a change relative to previously captured signals or images. According to some embodiments, the binary change detection may include an algorithm configured to compare two or more of the analyzed signals. According to some embodiments, for a comparison that shows the compared analyzed signals are the same, or essentially the same, the classifier labels the analyzed signals as having no detected (or identified) change. According to some embodiments, for a comparison that shows the compared analyzed signals are different, the classifier labels the analyzed signals as having a detected (or identified) change. According to some embodiments, two or more analyzed signals that are different may have at least one pixel that is different. According to some embodiments, two or more analyzed signals that are the same may have identical characteristics and/or pixels. According to some embodiments, the algorithm may be configured to set a threshold number of different pixels above which two analyzed signals may be considered as different.

Advantageously, change detection 366 enables fast detection of changes in the analyzed signals or images and may be very sensitive to the slightest changes therein. Even more so, the detection and warning of the binary change detection may take place within a single signal, e.g., within a few milliseconds, depending on the signal outputting rate of the optical sensor, or for an optical sensor comprising a camera, a within a single image frame, e.g., within a few milliseconds, depending on the frame rate of the camera.

According to some embodiments, the binary change detection algorithm may, for example, analyze the signals or images and determine if a non-black pixel changes to black over time, thereby indicating a possible change in the position of the longitudinal moving element, perhaps due to deformation or due to a change in the position of other components associated with the longitudinal moving element. According to some embodiments, if the binary change detection algorithm detects a change in the signals, a warning signal (or alarm) may be generated in order to alert the equipment or a technician that maintenance may be required.

According to some embodiments, the binary change detection may be configured to determine the cause of the identified change using one or more machine learning models such as model 370. For example, for a black pixel that may change over time (or throughout consecutive analyzed signals) to a color other than black, machine learning model 368 may output that the change is indicative of a change in the material of the longitudinal moving element, for example, due to overheating.

According to some embodiments, the method may include identifying the at least one change in the signals by analyzing dynamic movement of the element. According to some embodiments, the dynamic movement may include any one or more of linear movement, rotational movement, periodic (repetitive) movement, or the like. According to some embodiments, the change may be a damage, defect, cut size/length, cut growth rate, cut propagation, fracture, structural damage, defect diameter, cut, warping, inflation, deformation, abrasion, wear, corrosion, oxidation, sparks, smoke, fluid flow rate, drop size, fluid volume, rate of accumulation of liquid, change in texture, change in color/shade, size of formed bubbles, drops, puddle forming, puddle propagation, a change in dimension, a change in position, a change in color, a change in texture, change in size, a change in appearance, or any combination thereof.

According to some embodiments, the change detection may include quantitative change detection. According to some embodiments, the quantitative change detection may include determining whether a magnitude of change above a certain threshold has occurred in the analyzed signals or images. According to some embodiments, the magnitude of change above a certain threshold may include a cumulative change in magnitude regardless of time, and/or a rate (or rates) of change in magnitude. For example, the value reflecting a change in magnitude may represent a number of pixels that have changed, a percentage of pixels that have changed, a total difference in the numerical values of one or more pixels within the field of view (or the analyzed signals), combinations thereof and the like. According to some embodiments, the quantitative change detection algorithm may output quantitative data associated with the change in the analyzed signals.

According to some embodiments, the change detection may include qualitative change detection. According to some embodiments, the qualitative change detection algorithm may include an algorithm configured to classify the analyzed signals as depicting a change in the longitudinal moving element. According to some embodiments, the qualitative change detection algorithm may include a machine learning model configured to receive the analyzed signals and to classify the analyzed signals into categories including at least: including a change in the behavior of the longitudinal moving element, and not including a change in the behavior of the longitudinal moving element.

According to some embodiments, the change detection algorithm may be configured to analyze, for example by one or more machine learning models 370, other more complex changes in the analyzed signals generated by the optical sensors. According to some embodiments, the machine learning models may be trained to recognize complex, varied changes. According to some embodiments, the machine learning model may be able to identify complex changes, such as, for example, for signals generated by the optical sensors that may begin to exhibit some periodic instability, such that the signals can appear normal for a time, and then abnormal for a time before appearing normal once again. Subsequently, the signals may exhibit some abnormality that is similar but different than before, and the change detection algorithm may be configured to analyze changes and, over time, train itself to detect the likely cause of the instability. According to some embodiments, the change detection algorithm may be configured to generate a warning signal or an informational signal, if necessary, for a user to notice the changes in the longitudinal moving element.

On step 364, failure modes may be identified where changes have been detected. Step 366 may include obtaining data associated with characteristics of at least one failure mode of the longitudinal moving element. The data may be obtained from a computerized device, from a human, or a combination thereof. According to some embodiments, data associated with characteristics of at least one failure mode may include a location or range of locations of the failure mode on the element and/or a specific type of failure mode.

According to some embodiments, the failure mode may include any one of or more of a change in dimension, position, color, texture, size or appearance, a fracture, a structural damage, a tear, tear size, critical tear size, tear location, tear propagation, a specified pressure applied to the element, a change in the movement of one component in relation to another component, defect diameter, cut, warping, inflation, deformation, abrasion, wear, corrosion, oxidation, sparks, smoke, change in color/shade, or any combination thereof. It is appreciated that some parameters, such as the dimension may vary according to the specific situation. For example, a dimension may be relative to the capturing distance. In an example, a diameter of a cable of a helicopter may change due to wear, but also due to a bird cage.

According to some embodiments, a severity of the failure mode may also be determined based on the analysis.

According to some embodiments, obtaining data associated with characteristics of at least one failure mode includes receiving input data from a user via a user interface module.

According to some embodiments, the method may include obtaining data associated with characteristics of at least one failure mode of the element by identifying a previously unknown failure mode. According to some embodiments, identifying a previously unknown failure mode may include applying the received signals and/or the identified segment to a machine learning model 368 configured to determine a failure mode of the longitudinal moving element. According to some embodiments, the machine learning model 360 may be trained to identify a potential failure mode of the element. In some embodiments a single machine learning model 368 may be used for identifying a plurality of failure modes. In other embodiments, machine learning model 368 may include a plurality of models, each associated with a single failure mode.

In some embodiments, an identified failure mode may be associated with a measure, indicating whether the element represents a fault, a failure or none, based for example on the extent of the change or the failure mode realized. For example, rust of 5%-20% may be indicated as a fault, while rust of over 20% may be classified as failure.

In some embodiments, a trend of the failure may be assessed, based on exiting models, and optionally previous indications related to the failure mode. The trend may be used for predicting when maintenance of the element or the system is required, or when a fault may occur.

On step 372, certain detected situations, such as detected changes which do not comply with any of the failure modes may be suppressed, such that they are not further evaluated, are not considered when calculating faults and trends and reduce or eliminate the number of false alarms, and any action related thereto is suppressed. For example, some dirt or a fly on a longitudinal moving element, blurriness in some areas of the image, or the like, may appear as abnormal but analyzing the images does not provide an indication of any known failure mode, and thus no further examination or action is to take place.

According to some embodiments, suppression step 372 may classify whether the detected fault may develop into a failure or not, such as depicted by the failure mode junction 380. According to some embodiments, suppression step 372 may also utilize one or more machine learning models 376. According to some embodiments, suppression may indicate a fault as harmless.

If the signal or image does not indicate a fault or failure of a certain failure mode ("NO" on junction 380), the image or part thereof may be added to a training set to be used for enhancing any of the machine learning models by training step 384, such as machine learning model 360 used for identifying a failure mode, machine learning model 368 used for identifying a change or machine learning model 376 used for suppression of potential faults. However, other cases which are indicated as faults or failures may also be labeled accordingly and added to the training sets of the models to enhance their accuracy.

If the signal or image indicates a fault or failure ("YES" on junction 380), execution may return to step 340 of FIG. 3A.

Referring now back to FIG. 3A, once the images have been analyzed and optionally registered to identify objects or parts thereof appearing in two or more images, execution may return to step 304 where a location for monitoring may be determined.

Additionally or alternatively, on step 344, determining faults and monitoring them over time may be performed, for realizing a trend of a failure. In an example embodiment, referring to a certain failure mode, a first threshold of the failure mode may define a fault, while a second threshold of the failure mode may define a more severe fault or even a failure. The advancement rate of a fault may indicate a trend and predict when the fault may become a failure, such that preventive or corrective measurements can be taken prior to the formation of a fault. A trend may be calculated according to known models, which may indicate how severe the fault is and/or predict when maintenance is required. Prediction may use the detected failure, historical data, environmental conditions such as humidity or temperature, or the like. A trend may be calculated upon first detection of fault, and may be updated with further detections or the received data. The trend may thus provide the time until the next maintenance or a check-up which may be earlier than the normal schedule.

In some non-limiting examples, a rust stain may be monitored over time by comparing images depicting the rust stain and taken over time, to see if it is growing, a size or number of structural failures may be compared, or the like. For example, referring to the specific failure mode of rust, an accumulated area of 5% of the element's surface area may be defined as fault, while accumulated area of at least 20% of the element's surface area may be defined as failure. It may be predicted, based on two or more images and optionally knowledge about the behavior of rust and the specific conditions, how long it may take the rust to spread from 5% to 20% and thus determine the trend of this failure mode.

On step 348, an action may be taken, in particular if a fault is detected or if a trend of a fault is determined to be advancing, for example rust stains or corrosion spreading to larger areas or deeper towards the cable core, tears get longer, or the like.

According to some embodiments, the action may include generating a signal, such as an informational signal or a warning signal, if necessary. According to some embodiments, the warning signal may be a one-time signal or a continuous signal, for example, that might require some form of action in order to reset the warning signal.

The action may be, in non-limiting examples, transmitting or storing a report, or sending a message to a person in charge including the fault or failure, its severity and a time stamp, storing a report in a storage device, or the like. In some embodiments, and depending on the type of failure, a recommendation may be made to a user, for example to lubricate or replace cables, check the brake system, the engine, or the like.

In some cases, for example when a fault indicated as critical is detected at a degree of severity and/or at a degree of certainty exceeding respective thresholds, the monitored system may be halted to ensure the safety of the monitored system and its users.

As mentioned earlier, failure modes may be specific to certain types of longitudinal elements, or common to a plurality of types. The failure mode types may include but are not limited to any one or more of: structural damage, a cut, a defect, a cut of predetermined size or length, cut growth rate, cut propagation, fracture, defect diameter, warping, inflation, deformation, abrasion, wear, rust, corrosion, oxidation, sparks, birdcage, change in texture, change in color/shade, size of formed bubbles, a change in dimension of at least a portion of the segment, a change in position of at least a portion of the segment, a change in color of at least a portion of the segment, a change in texture of at least a portion of the segment, change in size of at least a portion of the segment, a change in appearance of at least a portion of the segment, linear movement of at least a portion of the segment, rotational movement of at least a portion of the segment, periodic (repetitive) movement of at least a portion of the segment, a change in the rate of movement of at least a portion of the segment, lack of lubrication, over lubrication, diameter changes, signs of abrasion, signs of wear, improper alignment, groove problems (missing cable/rope in a groove), twisting of the cable or rope, worn out strands, cuts as predictive signs of worn or any combination thereof.

Following is a more detailed reference to a few failure mode types and detection thereof.

Figure 4:
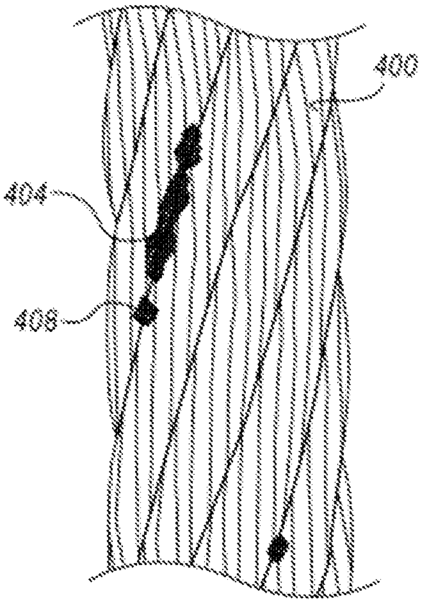
FIG. 4 is an illustration of a cable with rust stains as analyzed in accordance with some exemplary embodiments of the invention.

FIG. 4 shows an illustration of a cable 400 with rust stains 404 and 408.

In some embodiments, rust may be detected by first identifying pixels having values that are out of the acceptable range of values for a cable. In some embodiments, a minimal size of consecutive pixels or pixels that are at most within a predetermined distance apart may be required to be considered as a stain. In some embodiments, a polygon may be generated encompassing each such collection of neighboring pixels. Texture- and color-related features may then be extracted for each such polygon, including for example differences or uniformity among the pixel values, derivative of pixel values along pixel sequences, the density of changes in said values, and others.

The values of these features may be provided to a trained engine. The engine may have been trained on features extracted from polygons identified in previously captured images, each associated with a corresponding rust/no rust label. During training, the engine may determine linear and non-linear relations among different features and between the features and the label. Then, at prediction time, the features extracted from the captured frame(s) are input to the trained engine, which provides a prediction of whether the cable has a rust stain in the specific captured location.

In some embodiments, the depth of the rust into the cable may be estimated. In some embodiments, the engine may provide a certainty degree for the polygon to depict rust rather than a rust/no rust prediction. In some embodiments, the certainty degree may be associated with a number of pixels associated with a rust stain. In such implementations, a threshold may be set, such that a certainty degree exceeding the threshold is considered as rust, while a certainty degree below the threshold is considered as no rust. In some embodiments, the depth of the rust stain, i.e., how deep it penetrated the cable, may also be estimated, for example by an engine trained upon images demonstrating different penetration levels and corresponding labels.

In some embodiments, a certain range of certainty values, or other situations such as a combination of rust-indicating color features and non-rust-indicating texture features, may be interpreted as a "rouge" state, indicating a mixture of oil and rust. This situation may be indicative of fault or failure related to wear and tear of the cables, and should thus be reported as well.

Another type of fault may relate to rotation of the cables.

Figure 5:
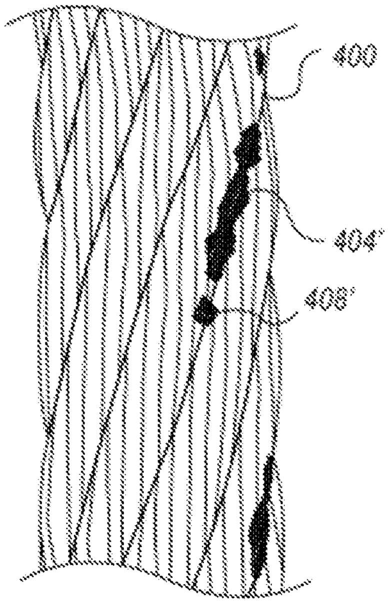
FIG. 5 is an illustration of the cable of FIG. 4, taken at another time.

Referring now to FIG. 5, showing cable section 400 taken at another time than shown in FIG. 4, and containing rust stains 404' and 408'.

In some embodiments, each artifact such as rust stains 404 and 408 may be associated with an identifier, calculated for example as a hash value. The hash values of stains appearing in different frames may be compared. Thus it may be identified that stains 404' and 408' are the same as stains 404 and 408. However, their horizontal location within the images are different, therefore, since video camera 118 is static, it may be deduced that cable 400 is rotating, which may be an indicator of an undesired behavior and may be reported as a possible fault.

In some embodiments, rotation may also be detected by other means. For example, color stripes may be painted on the cable. If the cable rotates, the stripes will not remain as a straight line but may deviate, which can be tracked by a corresponding engine.

Figure 6:
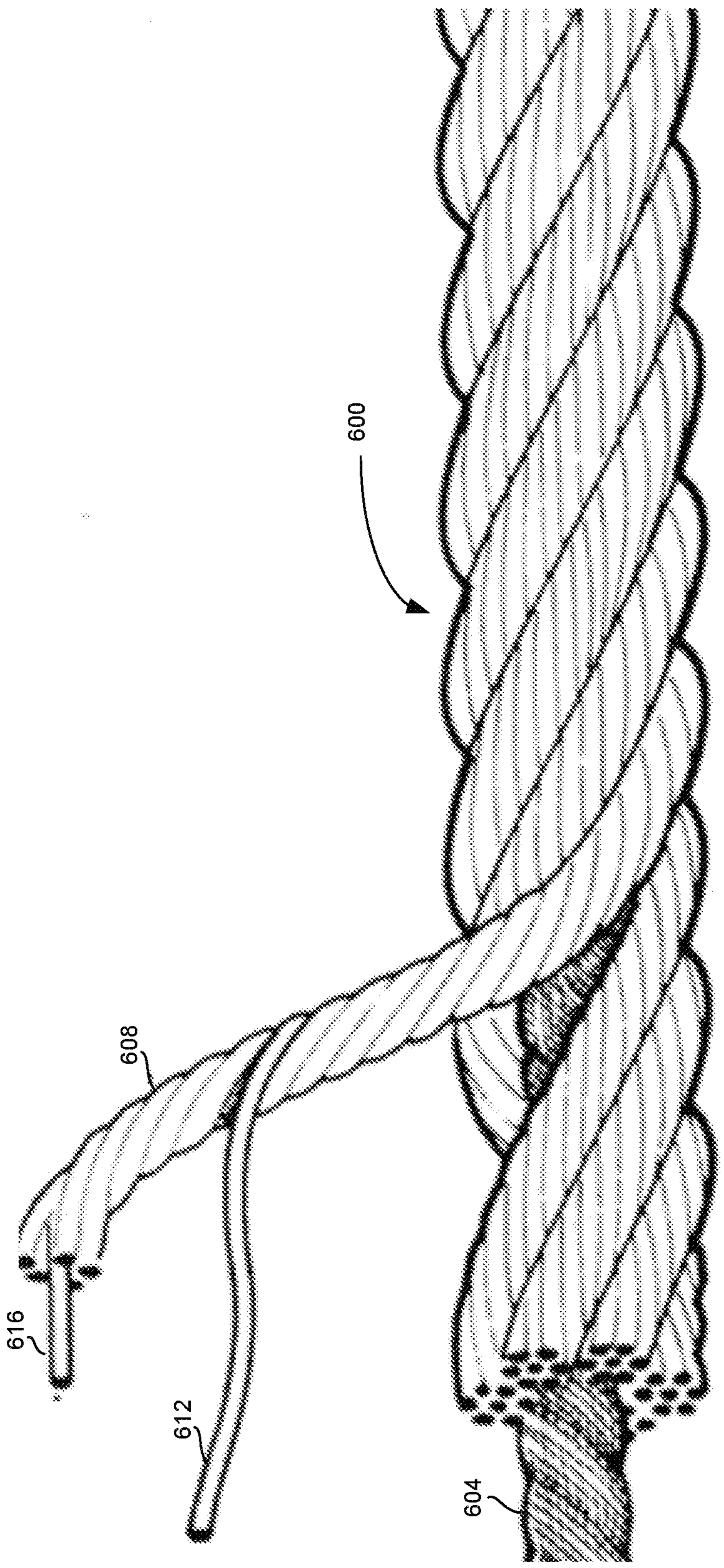
FIG. 6 is an illustration of the general structure of a cable.

Referring now to FIG. 6, showing an illustration of a typical cable.

A cable, generally reference 600, may comprise a core 604, made for example of steel or fiber. Core 604 may have multiple, for example between 3 and 6 strands 608 laid around it in a helical pattern. Each strand 608 may be made of a plurality of wires, for example between about 5 and about 10 wires wherein one of the wires is a center wire 616 and the others wires 612 are twisted around the center wire. The wires may be made, for example, of steel or another metal.

A cable may suffer from a plurality of failure modes, caused for example by friction between inner elements, heating, moving under load or stress, or the like. Some types of faults may relate to structural failure of a cable.

Figure 7:
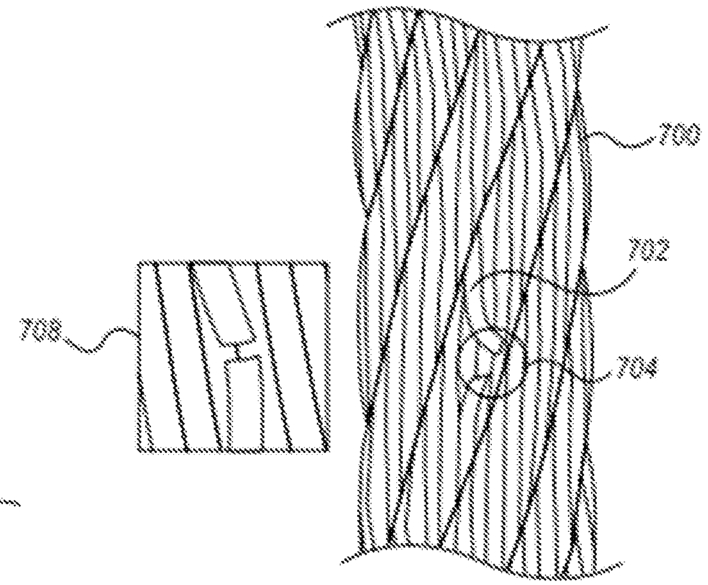
FIG. 7 is an illustration of a cable with a structural failure being a wire break as analyzed according to some exemplary embodiments of the invention.

Referring now to FIG. 7, showing a cable with a wire break which is a type of structural failure, as may be analyzed according to some embodiments of the invention.

FIG. 7 shows cable 700 comprising wire 702 having a break 704. In order to identify this type of failure, one or more frames depicting such break, such as frame 708, referred to as "window", may be obtained. It is appreciated that these windows may be relatively small for example between 6×6 pixels and 12×12 pixels, and may depict the break in the local context of the broken wire.

Given a frame taken under illumination, each of these small-size windows such as window 708 may be convoluted against the frame capturing the cable, to identify whether the frame contains a fragment that may be identified as one of the forms of wire break depicted in the small-size windows, in which case the cable itself may contain a break. It is appreciated that the more windows are available, the more instances or forms of break are checked and may be detected, thereby increasing the chance of detecting a wire break in the frame.

It is appreciated that strand breaks may be detected in similar manner, by obtaining windows depicting different instances of broken strands, and convoluting the windows with a frame depicting a cable.

Figure 8:
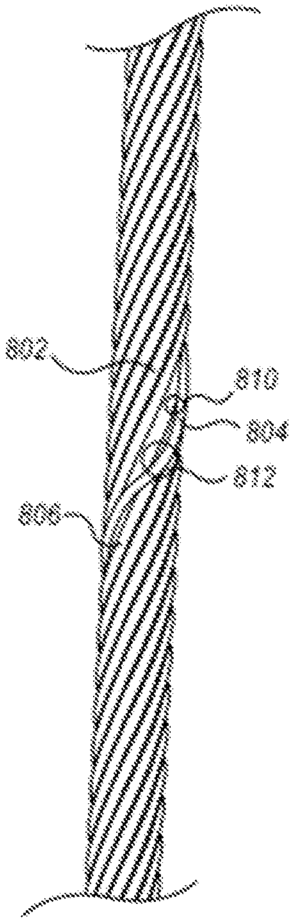
FIG. 8 is an illustration of a cable with another type of structural failure as analyzed according to some exemplary embodiments of the invention.

Referring now to FIG. 8, showing another type of structural failure of a cable, being core damage or cable fraying, as may be analyzed according to some embodiments of the invention.

FIG. 8 shows cable 800 comprising wires 802 and 804 belonging to the same strand and supposed to be adjacent to one another, but at some point one of the wires may get stretched, such that at some locations, for example area 810, the distance between wires 802 and 804 increases, and in other locations for example area 812 one of the wires goes on top of the other, such as wire 804 being over wires 806.

Such failure may also be identified using small-size windows depicting different instances of such failure, for example where one wire is overstretched such that its distance form neighboring wires increases, or that it goes over the other wire.

The small-size windows may be convoluted against the cable captured in the frame. Thus, it may be identified whether the image of the cable contains a section that may present one of the forms of the failures depicted in the small-size windows. It is appreciated that the more windows illustrating this kind of failure are available, the more instances of failure are checked and may be detected, thereby increasing the chance of detecting thus structural failure.

Some types of faults may relate to other structural deformation of cables, which may bear many forms and may thus be hard to predict. Therefore, in some embodiments, a plurality of small-size windows depicting segments of a normal wire or strand may be obtained. Once an image of a monitored cable is analyzed, it may be segmented, and each segment depicting a part of the cable may be examined, for example compared to the windows depicting a normal structure. If a segment complies with at least one of the windows showing a normal pattern, it may be declared as normal, while if it does not comply with any of the normal windows, it may be declared, or suspected as abnormal.

It is appreciated that structural failures as shown in FIGS. 7 and 8 above may also be identified using an artificial analysis engine, trained upon a plurality of images demonstrating either of the failure modes, such that given another image of a cable, the engine may predict the probability that the cable contains the respective type of failure mode to some degree, which may be associated with the location of the failure as determined during capturing.

In some embodiments, an image depicting cables may be segmented to differentiate the cables from the background, and then continue processing each such segment depicting a single cable separately, for example as detailed above.

In some embodiments, segmentation of a cable may be performed by obtaining an image such as a gray-scale image, passing it through a low pass filter, detecting local minima points indicating recesses between strands and passing through morphologic filtering to obtain a strand mask.

Figure 9:
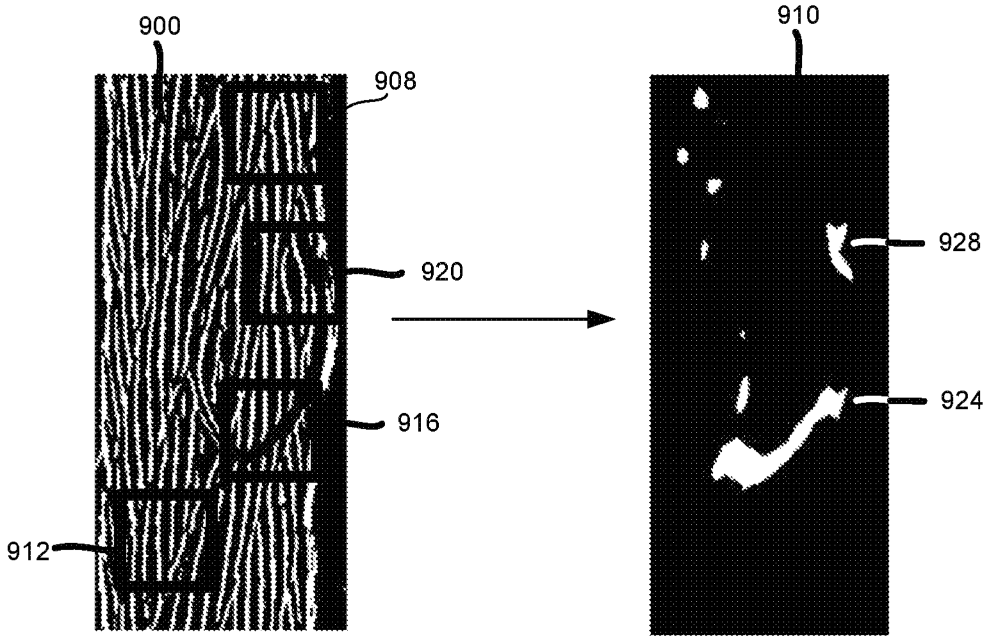
FIG. 9 is an illustration of a frame and segments thereof, before and after processing, in accordance with some exemplary embodiments of the disclosure.

Referring now to FIG. 9, showing a frame depicting longitudinal moving elements and segments thereof, before and after processing, in accordance with some exemplary embodiments of the disclosure.

FIG. 9 shows a frame 900 depicting a monitored cable. Each of segments 908 and 912 comply with a pre-obtained window depicting a normal wire structure, while segments 916 and 920 do not. It is appreciated that segments 908, 912, 916 and 920 are exemplary only, and that all segments of the frame are examined against the pre-obtained windows, including overlapping segments.

After the segmentation and matching, the areas in processed frame 910 associated with windows identified as abnormal may be unified and corresponding bounding polygons may be defined, such as polygons 924 and 928.

Further failure modes may relate to lubrication problems of the cables. Lubrication may be applied to the wire during manufacturing, and penetrates all the way to the core. Lubricating a cable has two main benefits: it reduces friction as the individual wires and strands may move over each other, and provides protection against corrosion on the internal and external surfaces of the cable.

The lubrication is substantially transparent and hard to detect visually. However, the lubrication refraction coefficient is different than the refraction coefficient of air. Thus, the values of features that relate to the light refraction may be obtained from segments of the captured frame, and compared to predetermined feature values. The predetermined features may be learned in a laboratory through capturing cables known to have lubrication faults (or in which lubrication deficiencies have been intentionally created), and cables known not to have such faults. The segments that exhibit values associated with faults may thus be identified and bounding polygons may be defined.

In further embodiments, lubrication faults may be identified by a neural network that considers the differences between the cables, taking into account the differences in the capturing angles, illumination conditions, or the like. In some embodiments, a multi backbone neural network, for example a convolutional neural network (CNN) may be used for identifying areas demonstrating lubrication faults. A network may assess the situation of each cable separately, followed by a unified network that combines the information obtained by the separate networks and assesses the situation of the monitored cable system.

Some types of faults may relate to sliding or thinning, i.e., diameter decrease of at least a part of one or more cables or straps.

Figure 10:
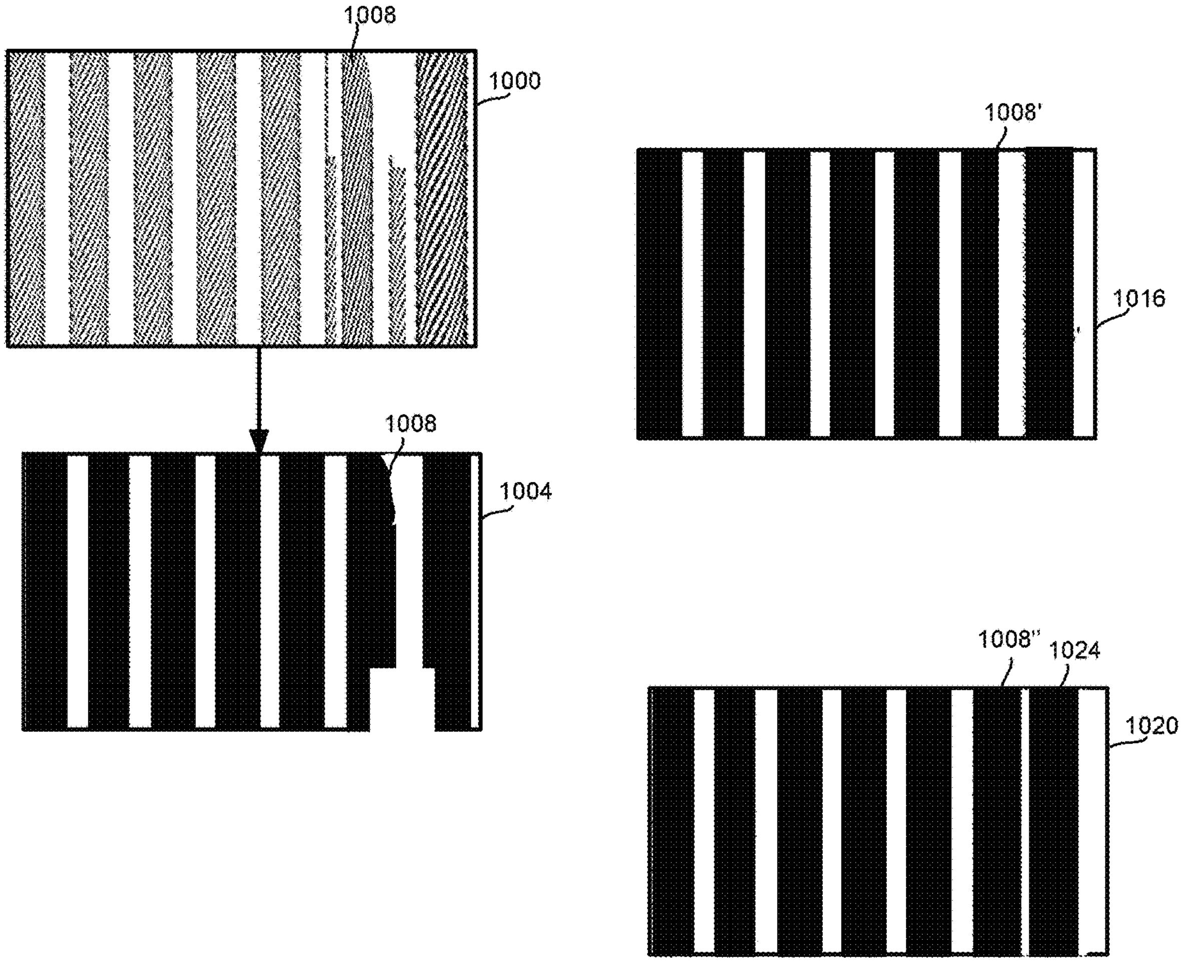
FIG. 10 is an illustration of a frame depicting failure modes of diameter decrease or sliding of cables or straps.

Referring now to FIG. 10, showing a typical case of diameter decrease of a longitudinal moving element.

Frame 1000 may be captured, depicting a plurality of cables including cable 1008 which are supposed to be equally spaced and of equal width.

In some embodiments, frame 1000 may undergo preprocessing for removing camera/sensor/lens-bases distortions, or otherwise enhancing the image. In some embodiments, preprocessing may also be useful in determining that the image is unusable as is due for example to camera problems, such as a dirty lens, focus problems, or the like, in which case the camera may require maintenance. In some embodiments, preprocessing may include dividing at least frame 1000 or a portion thereof into a plurality of tiles. According to some embodiments, the preprocessing may include applying one or more filters to the one or more images, such as but not limited to noise reduction filters.

In some embodiments, a background/foreground GMM filter may be applied to the image, to perform background subtraction and better separate the longitudinal moving elements from their background. Further morphological filter and edge detection may be applied to the image, to obtain further separation. The resulting image, as shown for example in frame 1004, clearly shows a morphological failure of longitudinal moving element 1008.

However, in other situations, if the filters obtained image 1016, longitudinal moving element 1008' is seen to be thinner than the others, indicating a failure mode that can explain thinning, such as over tension.

In a further example, as shown in frame 1020, longitudinal moving elements 1008" and 1024 are of the expected width, but the distance therebetween is smaller than it should be and smaller than the other inter-longitudinal moving element distances, thereby indicating a sliding failure mode of longitudinal moving element 1024.

A further problem that can occur relates to cables getting overstretched. One such situation may occur in cable connecting the cart and the counterweight in an elevator.

Figure 11:
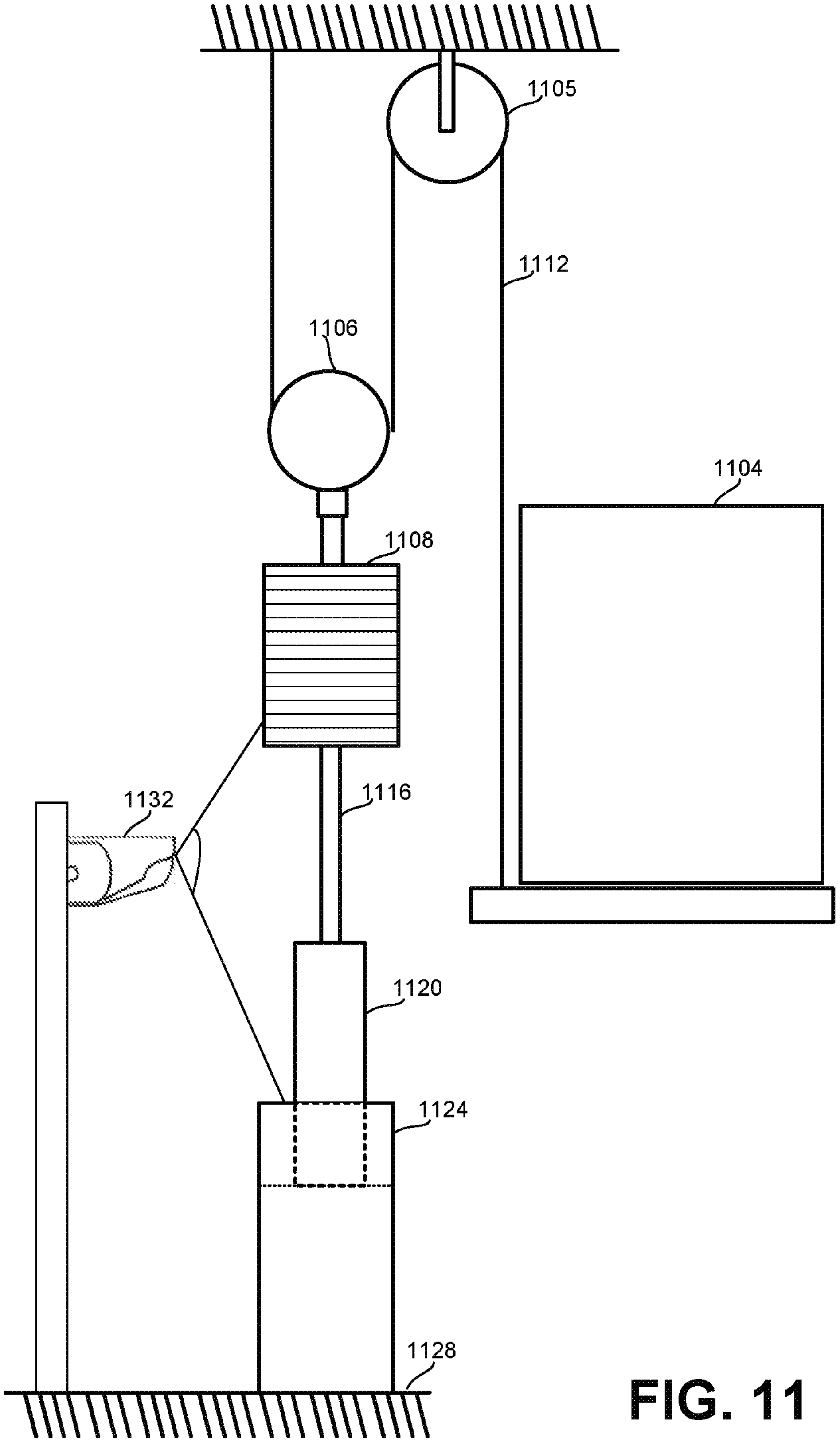
FIG. 11 is a schematic illustration of a side view of an elevator in accordance with some exemplary embodiments of the disclosure.

Referring now to FIG. 11, showing a schematic illustration of a side view of an elevator. The elevator comprises car 1104, and counterweight 1108, and a cable 1112 connecting therebetween for example via pulleys 1105 and 1106 or otherwise enabling relative motion between car 1104 and counterweight 1108, such that when one goes up the other goes down, and vice versa, thereby having to use the operating engine only to overcome the weight difference rather than the full weight of the car with people, cargo or other objects therein.

When the car is at its highest point, the counterweight is at its lowest point. Typically, it is required to dampen the descent of the counterweight when arriving to the bottom and the ascent when approaching the topmost point, such that the car stops softly when arriving to the destination. To achieve that, the counterweight may be coupled, for example via a rod 1116, to a piston 1120 that enters a cylinder 1124 located on floor 1128 of the elevator pit. A given length of cable 1112 determines the distance of counterweight 1108 from cylinder 1124 when car 1104 is at its topmost position. Shortening of this distance may occur due to stretching of cable 1112, and should be alerted. Thus, in some embodiments of the disclosure, the area between the top part of cylinder 1124 and the lowest acceptable location of the counterweight may be monitored, for example by capture device 1132, such as a camera, a video camera, or the like. The area may be captured at multiple times. For example, the area may be captured at time intervals, such that in at least a predetermined confidence level, the lowest point has been captured within a predetermined time period. In another embodiment, the area may be captured when the controller of the elevator indicates that the elevator is at the top floor, which implies that the counterweight is at its lowest position. If the distance is below a predetermined threshold, an alert may be issued.

In some embodiments, the diameter of cable 1112 may be measured and compared to a predetermined value. If the diameter is lower than expected, for example in at least a predetermined amount, an alert may be issued as that may also indicate wear and tear of the cable.

Various embodiments may be implemented for identifying the distance between cylinder 1108 and counterweight 1108 or piston 1120. For example, identifying may use a trained AI engine, template matching, recognizing an engraved, printed or attached text, code, QR code or the like. It is appreciated that although cylinder 1124 does not move, the lightning conditions may change, or the location of capture device 1132 may change due to the movements of the nearby systems. Therefore it may be required to identify also cylinder 1124 rather than assume its location for determining the distance between cylinder 1124 and counterweight 1108.

Yet another issue relates to the calculation of the distance. The ratio of pixel/mm may change throughout the image space, and is a function of the camera intrinsic parameters such as focal point, lens and sensor characteristics, or the like, and extrinsic parameters such as distance to all objects in the FOV and their real-world sizes, which are typically not provided. The ratio may thus differ for counterweight 1108/piston 1120 and cylinder 1124. The ratio may be obtained for each of them, for example by measuring a real segment on each of them and calculating the number of pixels in a corresponding part of an image. Given the two ratios, it is possible to interpolate the number of pixels in an image to a real world distance, and compare the distance to the threshold.

Although the discussion above related mostly to cables, it is not limited to cables, and is also applicable to other longitudinal moving elements, such as straps, ropes, or the like. While some of the faults described above are applicable also to straps, straps may exhibit other faults, such as over or under tension, tears, sliding, folding, or the like, which may be detected in a similar manner, of applying different engines for analyzing frames capturing one or more straps.

It is appreciated that although the discussion above was more focused on elevator cables or other linearly moving elements, the disclosure is not limited to such environments, and is equally applicable to longitudinal elements moving in a closed loop, such as a conveyor belt, a sky tram, cable cars, cable winding machines, or the like, elements that are connected on one end to the system, such as in a helicopter or a crane, moving over a horizontal plane, a vertical plane, an inclined plane, or the like. The apparatus and method may operate to detect faults relevant to the configuration and the type of elements.

It is appreciated that the disclosure is also applicable to longitudinal moving elements having one end thereof secured to another element stationary with regards to the movement of the longitudinal moving element while the other end may be released and retreated. One example of such situations is a rescue hoist cable descending from a helicopter, and used for elevating people or objects into the helicopter.

Figure 12:
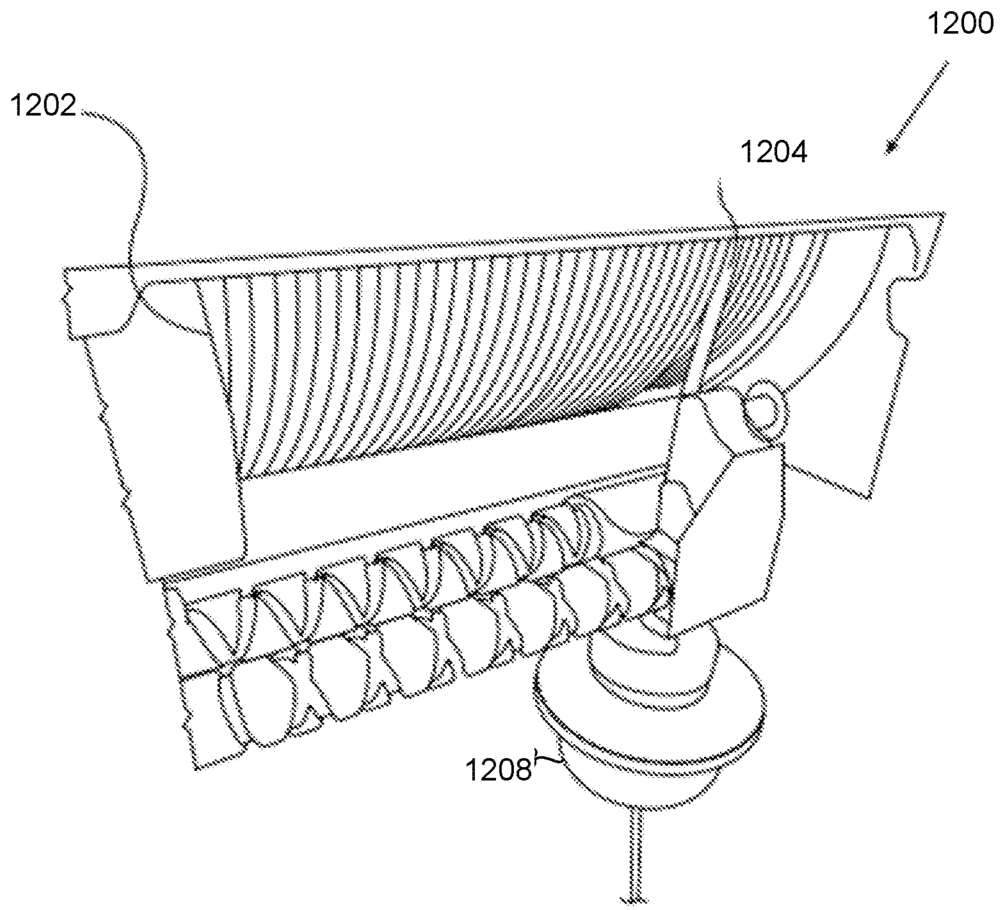
FIG. 12 is an exemplary illustration of a system where one end of a cable is static relative to the monitored system, in accordance with some exemplary embodiments of the disclosure.

Referring now to FIG. 12, showing such system which may be a complex releasing a cable from a helicopter, in accordance with some embodiments of the disclosure, the system, generally referenced 1200, comprises a cylinder 1202, also referred to as drum, to which one end of cable 1204 is attached and around which cable 1204 is rolled, and from which cable 1204 descends. A solution as described above may be used for detecting motion within the cable, whether by image analysis or any other motion sensor capable of sensing motion as described above, from a controller providing motion indication of the cable, or in any other manner. Once motion is detected, one or more images of the cable may be captured, as described in FIGS. 13 14A, 14B and 15 below. The embodiments shown in FIGS. 13 14A, 14B and 15 may be used, for example, to monitor a rescue hoist cable descending from a helicopter, and used for elevating people or objects into the helicopter. Similar systems may be used for cables of cranes and the like.

Figure 13:
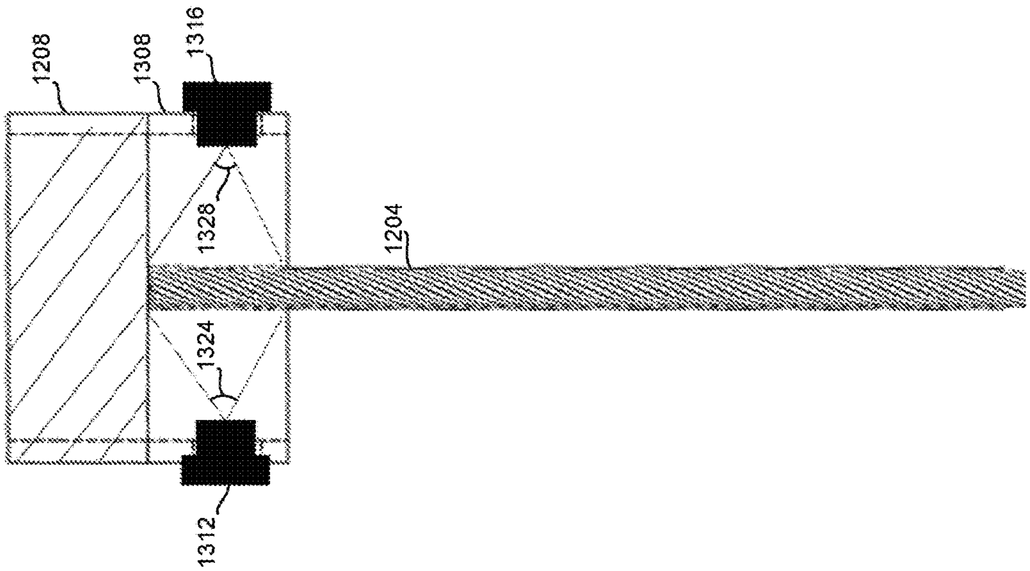
FIG. 13 is a schematic illustration of a side view of first exemplary embodiment of a system for monitoring a cable being released from a drum, in accordance with some exemplary embodiments of the disclosure.

Referring now to FIG. 13, showing a schematic illustration of a side view of a first exemplary embodiment of a system for monitoring a cable being released or collected, in accordance with some embodiments of the disclosure.

The system comprises ring 1308, centered around cable 1204. Ring 1308 may connect under cable driver 1208.

Ring 1308 may comprise one, two, or more image capture devices such as cameras 1312 or 1316. Each such capture device may capture a segment of cable 1204, the segment determined by the corresponding viewing angle 1324, 1328, respectively.

The location of ring 1308 and thus capture devices 1312, 1316 capturing the cable as it is being released or collected, provides for capturing cable 1204 in motion, such that images of the full length of the cable (excluding the topmost part that connects to the drum) may be accumulated and analyzed for faults or failures.

In some embodiments, ring 1308 may comprise or be operatively coupled to a motor adapted to rotate ring 1308 around cable 1204. If ring 1308 is adapted to rotate, a smaller number of capture devices, for example one or two capture devices may be used, although it may take longer to verify that all segments of cable 1204 have been captured from all directions. A larger number of cameras may provide for capturing cable 1204 simultaneously from multiple directions, and may thus provide for faster coverage.

If ring 1308 is not adapted to rotate, ring 1308 may comprise a larger number of capture devices, for example three devices, four devices or the like, to ensure that all segments of cable 1204 have been captured from all directions. The number of capture devices may also depend on the distance between the capture device and the cable, the field of view of the capture device, and the cable diameter. Additionally or alternatively, assuming that cable 1204 rotates around its long dimension, a longer capturing time may provide for capturing all segments of the cable from all directions. In this embodiment, capturing is mainly operative when the cable is being released or collected, as otherwise only a certain segment of the cable, or none at all, is captured.

Thus, if ring 1308 is static, the cable is monitored by a capture device that is static relative to the monitored system. On the other hand, if ring 1308 is rotating, the cable is monitored by a capture device that moves in a plane that is perpendicular to the advancement of the cable.

Figure 14A:
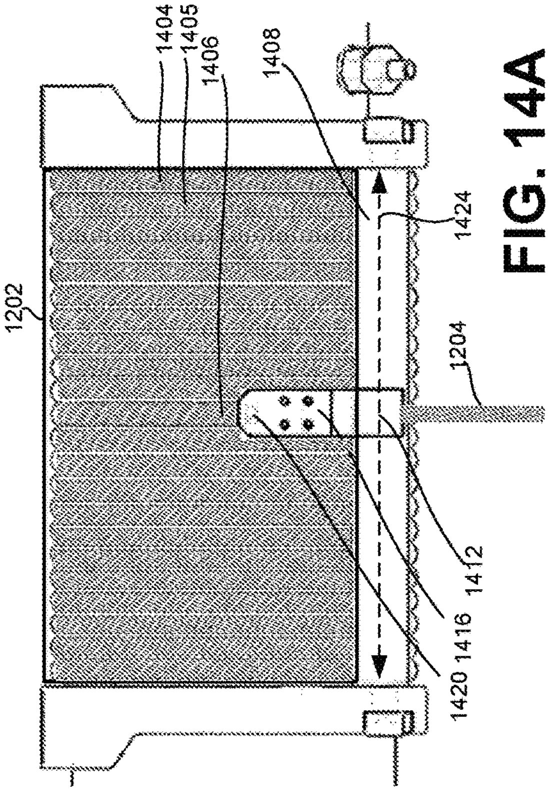
FIGS. 14A and 14B are schematic illustrations of a side view and top view, respectively, of a second exemplary embodiment of a system for monitoring a cable being released, in accordance with some exemplary embodiments of the disclosure.
Figure 14B:
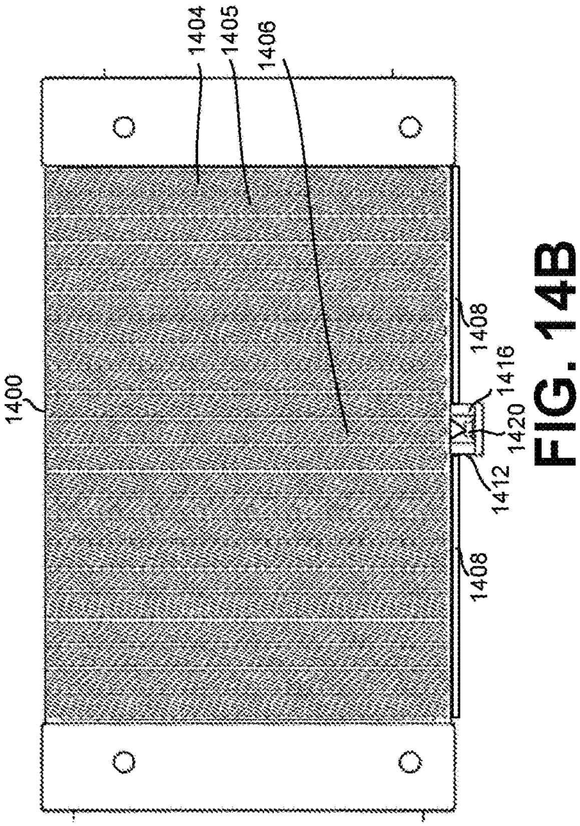

Referring now to FIG. 14A and FIG. 14B, are schematic illustrations of a side view and top view, respectively, of a second exemplary embodiment of a system for monitoring a cable, in accordance with some embodiments of the disclosure.

In the embodiment of FIGS. 14A and 14B, the system may comprise a cable release component 1412 which advances along a bracket 1408 located below the drum. Cable release component 1412 may advance along line 1424, such that at each location, cable release component 1412 releases a corresponding winding of the cable. For example, at the shown location, winding 1406 will be released, and when cable release component 1412 will arrive to the rightmost end of bracket 1308, windings 1404 and 1405 will be released.

Cable release component 1412 may be extended with member 1416 having attached thereto capture device 1420 facing drum 1202. Capture device 1420 may thus capture the part of the cable that is being released or collected from the winding it is facing. As cable releasing component 1412 advances along bracket 1408, so does member 1416 and capture device 1420, such that when further segments of the cable are released or collected, the segments are captured by capture device 1420. Thus, this embodiment is also mainly useful when the cable is being released or collected, otherwise cable releasing component 1412 is static and captures just a small part of the cable.

During the motion of movement of cable release component 1412, capture device 1420 may also capture the winding of the cable, and thus identify failure modes of the cable as well as in the winding of the cable, for example whether windings overlap, windings are too spaced apart, or the like.

Thus, in this embodiment, the cable is monitored by a capture device that captures different windings of the cable.

Figure 15:
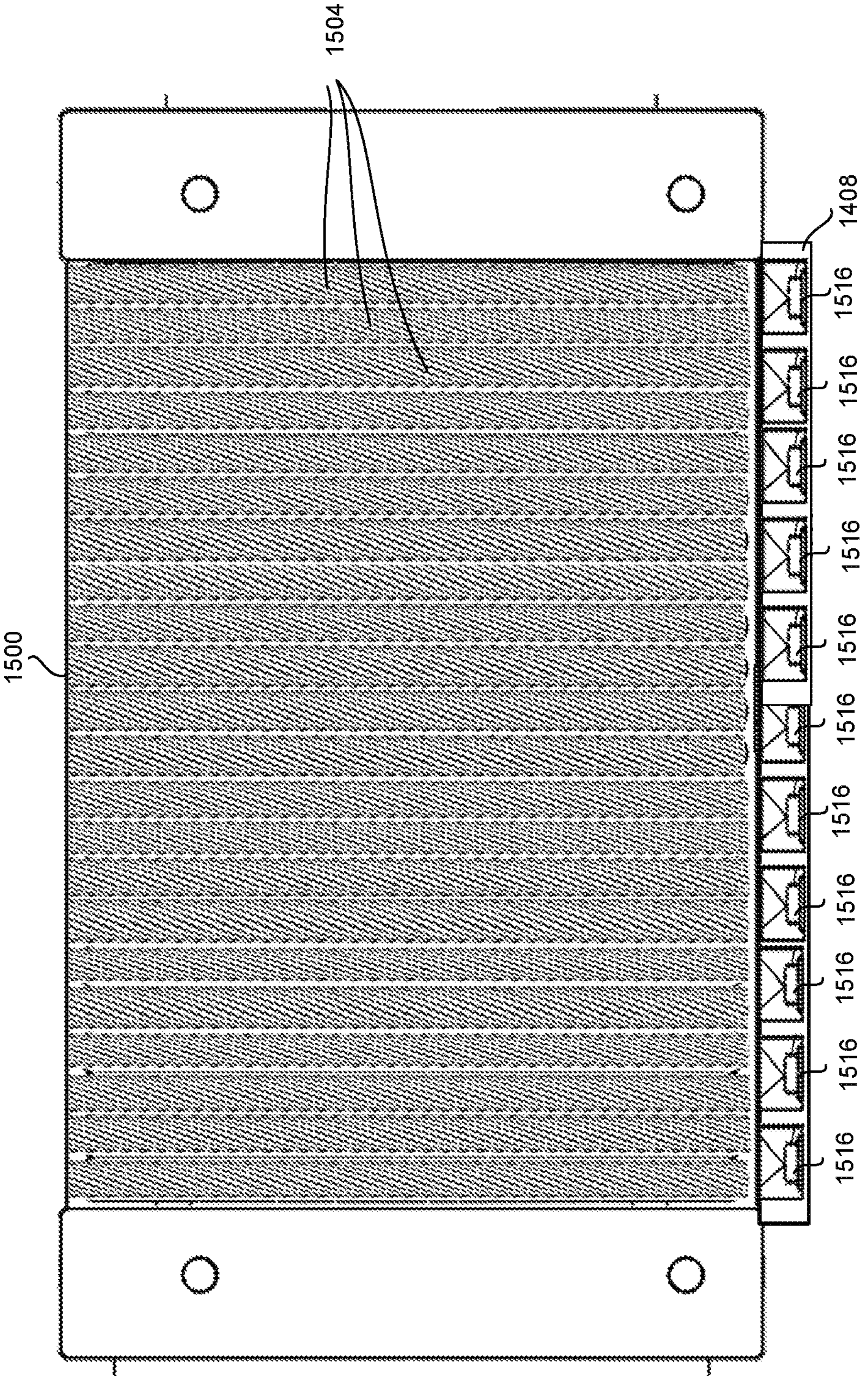
FIG. 15 is a schematic illustration of a top view of third exemplary embodiment of a system for monitoring a cable being released, in accordance with some embodiments of the disclosure.

Referring now to FIG. 15, showing a schematic illustration of a top view of a third exemplary embodiment of a system for monitoring a cable, in accordance with some exemplary embodiments of the disclosure.

In the embodiment of FIG. 15, one or more static cameras 1516 may be installed on a bracket 1508 attached to a cover of drum 1500. Capture devices 1516 may be installed on the internal part of the cover, such that they face the cable windings. Each capture device 1516 may capture segments or parts thereof of one or more windings, wherein the captured segments change as the cable is released from the respective winding.

The embodiment of FIG. 15 may provide for identifying faults in the cable, as well as in the winding of the cable, for example whether windings overlap, windings are too spaced apart, or the like.

Thus, in this embodiment, the cable is monitored by one or more static capture devices.

In some embodiments, it may be ensured that all parts of the cable are being monitored within a time frame, with any of the methods detailed above such as random, planned, or the like. Additionally, in some embodiments, a registry of the parts of the cable that have been monitored and the respective date and/or time may be maintained, to ensure that all parts of the cable are being monitored.

Figure 16:
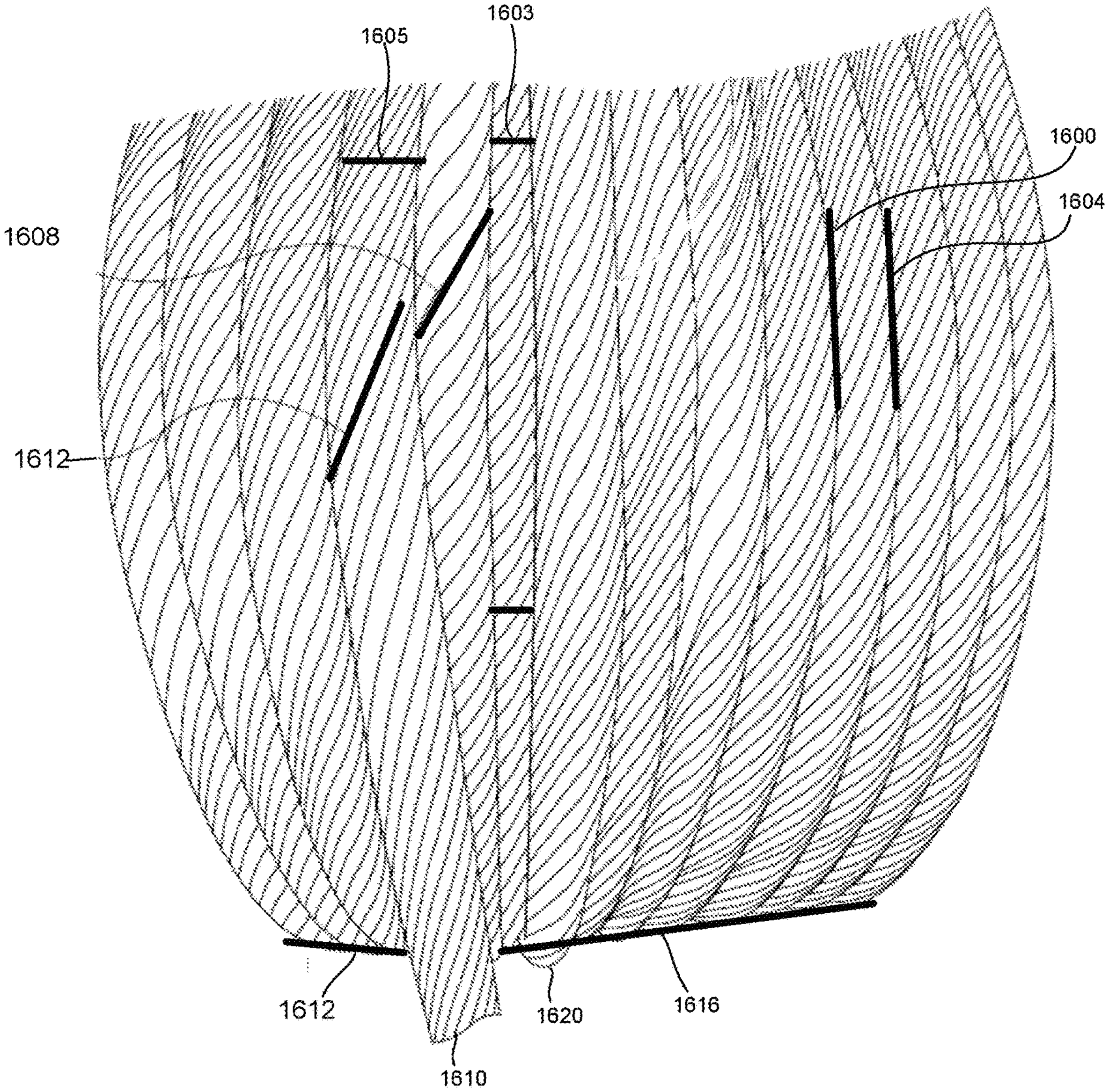
FIG. 16 is a schematic illustration of a drum having cable wound around it with irregularities and methods for discovering the same, in accordance with some exemplary embodiments of the disclosure.

Referring now to FIG. 16, illustrating drum having cable wound around it with irregularities, and methods for discovering the same, in accordance with some exemplary embodiments of the disclosure.

When the cable is released (or collected), the cylinder rolls, and the cable releases one winding then the adjacent one and so on. When the last winding in the row is released, the direction is reversed and the windings are released in the other direction. Thus, if releasing or rolling advances as expected, the windings to the left of the currently released winding form a uniform arrangement and similarly to the windings to its right.

In some embodiments, the windings may be recognized, and their widths may be measured, optionally after correcting the fisheye effect, if present, as may be introduced by the capture device being at close proximity to the cable.

If the widths are substantially different, for example the difference between the maximal and minimal widths exceeds a threshold, it may indicate a problem with the cable or with the rolling mechanism. For example, width 1605 of one winding is substantially similar to the widths of the other windings, except for width 1603 that is substantially smaller, which may indicate a problem.

In another example, the bottom part of each winding appears as a part of an ellipse or a parabola. It may thus be determined whether the lowest points of the windings are all on a straight line. If this is not the case, there is a problem with the cable or the rolling mechanism.

For example, line 1612 indeed connects the bottom parts of the windings to the left of winding 1610 which is currently being released. However, line 1616 does not contain point 1620 which is the lowest point of one winding, therefore there is a problem with the rolling or releasing. It is appreciated that some deviations from a straight line may be allowed, for example deviations of up to a predetermined distance from a straight line connecting as many of the lowest point as possible. A deviation exceeding the threshold may indicate a problem.

It is appreciated that the lines connecting the lowest points of the windings to the left and to the right of the currently released winding are not necessarily expected to be co-aligned since one of them is supposed to represent one more winding than the other.

In yet another example, the structure of the cables may be analyzed. For example, it may be determined whether the lines separating windings, such as lines 1600 and 1604 are substantially parallel, whether the lines separating strands within the same winding or not, such as lines 1608 and 1612 are substantially parallel, or whether the lines separating wires within the same strand or within the same winding are substantially parallel.

If any of these line groups are not parallel, for example their gradient difference exceeds a predetermined threshold, this may be an indication of a problem.

In some embodiments, the system may be coupled to a device for calculating the location of the cable that is being monitored at any given time. In some embodiments, an odometer may be used for such assessment.

In some embodiments, the captured location of the cable may be determined based on marks provided on the cable, on identifying small segments of the cable as described above, or the like.

In some embodiments, the rolling speed of the cable may be low enough relative to the shutter speed of the capture device, such that within each frame the cable may seem static, and no illumination may be required.

It is appreciated that the cable may be monitored for some of the failure modes detailed above in association with other system, such as rust, lubrication problems, break, or other structural failures. However, the cable may be subject to more specific failure modes, such as being aligned when rolled up, which may be detected using tools including image analysis tools, AI engines, and others, as described above for analyzing frames capturing segments of the cable. As above, the tools for analyzing the captured frames may be operated simultaneously, sequentially, or the like.

It is appreciated that the disclosure is also applicable to other fast moving systems or elements. By combining a stroboscopic light source operated in accordance with a capture device thereby enabling the capturing of sharp images, and registration of images, it may be ensured to at least a predetermined confidence level that all parts of the system have been captured, and may be analyzed for failure modes. The elements may be linear moving elements, rotating elements, or elements moving in any other manner, in linear, angular or combined velocity, in two or three dimensions, or the like. The disclosure is thus particularly applicable to fast moving elements.

Figure 17:
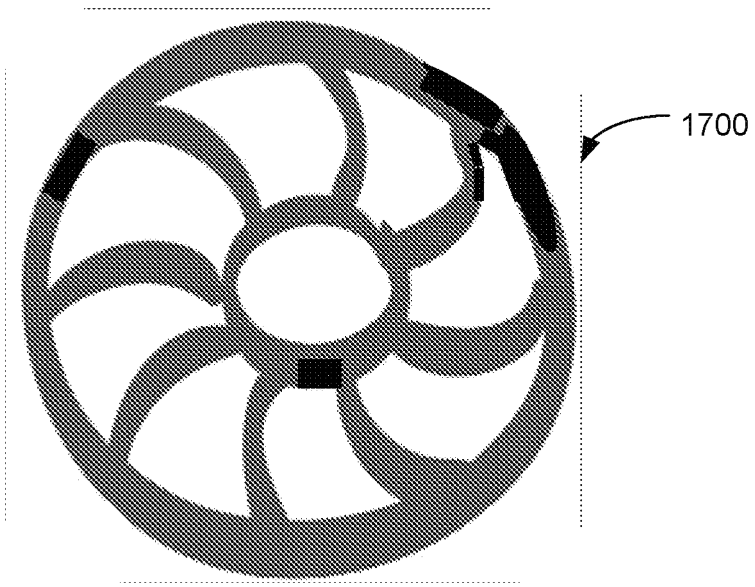
FIG. 17 shows a schematic illustration of a turbo motor to be monitored, in accordance with some exemplary embodiments of the disclosure.

In one example, as shown in FIG. 17, a turbo motor may be analyzed. A turbo (including a turbocharger or supercharger) increases the power output of an internal combustion engine by compressing and forcing a greater volume of air into the cylinder. A turbo motor typically consists of a turbine 1700 and a compressor. The turbine is driven by exhaust gases, or an external (usually electric) motor, or powered directly by the engine; a belt pulley drives gears that cause a compressor fan to rotate the motor while the compressor draws in exterior air, compresses it, and supplies it to the cylinders. Turbochargers utilize an impeller that rotates at high speeds, typically ranging from tens of thousands to over 100,000 RPM, with smaller turbochargers operating at higher speeds. The rotational speed varies based on factors such as the turbocharger's size, engine requirements, and specific application.

By capturing areas of the turbine, the images may be analyzed for one or more failure modes, such as rust, cracks, structural distortions, or the like. In addition to analyzing each image separately, the images may be registered to analyze objects or locations appearing in two or more images. By analyzing images of an area taken over a period of time, a trend may be discovered, such as a developing failure mode. By analyzing images capturing different views but covering common areas, it may be determined whether all areas of the monitored system have been analyzed, which areas need further analysis, or the like.

Figure 18:
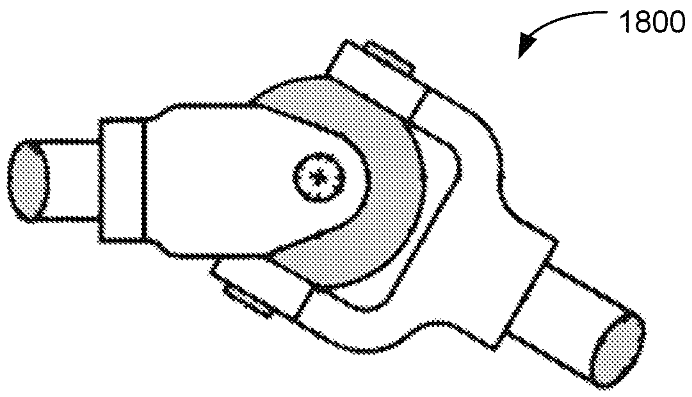
FIG. 18 shows a schematic illustration of a Cardan bearings to be monitored, in accordance with some exemplary embodiments of the disclosure.

In another example, and as shown in FIG. 18, the disclosure may be applied towards imaging and analyzing Cardan bearings (also referred to as Cardan joints), such as Cardan bearing 1800.

It is appreciated that the disclosure is not limited to the shown examples. Rather, the disclosure may be applied towards any other rotating or moving element, including fast rotating or moving elements.

The present disclosed subject matter may be a system, a method, and/or a computer program product. The computer program product may include a computer readable storage medium (or media) having computer readable program instructions thereon for causing a processor to carry out aspects of the disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), Application Specific Integrated Circuit (ASIC), or programmable logic arrays (PLA) may execute the computer readable program instructions by utilizing state information of the computer readable program instructions to personalize the electronic circuitry, in order to perform aspects of the disclosed subject matter.

Aspects of the disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosed subject matter has been presented for purposes of illustration and description, but is not intended to be exhaustive or limited to the invention in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A system for monitoring a moving element within a monitored system, comprising:
- an illumination device configured to periodically provide instantaneous light to a longitudinal moving element;
- an image sensor fixed with respect to the monitored system and configured to capture, at different times, a plurality of images of different portions of the moving element during motion under illumination emitted by the illumination device; and
- at least one processor configured to:
  - obtain the plurality of images;
  - analyze at least one of the images to determine whether at least one failure mode is present within a portion of the moving element depicted in the image;
  - register at least one image with at least one other image to obtain further information about the at least one failure mode;
  - keep track of monitored locations and determine whether all parts of the moving elements have been captured and analyzed based on image registration; and
  - provide output indicating whether the at least one failure mode is identified within the moving element.

2. The system according to claim 1, wherein said obtaining and analyzing are performed repeatedly.

3. The system according to claim 2, wherein said obtaining and analyzing are repeated until images of all parts of the moving elements have been obtained and analyzed within a predefined timeframe.

4. The system according to claim 1, further comprising predictively determining, based on motion information of the moving element, a portion of the moving element to be captured next.

5. The system according to claim 1, wherein said registering comprises registering the at least one image with an image depicting a second area adjacent to an area captured in the at least one image.

6. The system according to claim 1, wherein said registering comprises registering the at least one image with a predetermined image depicting a known spatial area of the moving element.

7. The system according to claim 1, further comprising analyzing a trend of the at least one failure mode at the location over time.

8. The system according to claim 1, wherein the output is provided by updating a database, sending a message, displaying a message on a display device, or issuing a vocal alert.

9. The system according to claim 1, further comprising:
- obtaining an indication of whether the moving element is in motion relative to the monitored system; and
- performing said obtaining, said analyzing and said registering subject to the moving element being in motion.

10. The system according to claim 1, wherein said image sensor is operated with a rolling shutter.

11. The system according to claim 10, wherein said illumination device is configured to start illuminating the moving object after all rows or columns of a sensor of the image sensor are opened and end illuminating before any of the rows or columns is closed.

12. The system according to claim 1, wherein the moving element is a longitudinal moving element.

13. The system according to claim 1, wherein the moving element is a rotational moving element.

14. The system according to claim 1, wherein the moving element is a cable.

15. The system according to claim 1, wherein the monitored system is at least one system selected from the group consisting of: an elevator, a helicopter, a crane, a conveyor belt, a turbo fan, a sky tram, a cable car, and a cable winding machine.

16. The system according to claim 1, wherein the illumination device is adjusted to be activated and inactivated in at most 10 mSec.

17. A computer-implemented method for monitoring a moving element within a monitored system, the method comprising:
- periodically providing, by an illumination device, instantaneous light toward the moving element as the moving element moves relative to the monitored system;
- capturing, by an image sensor fixed with respect to the monitored system, a plurality of images of different portions of the moving element, at different times, during motion under illumination emitted by the illumination device;
- analyzing, by at least one processor, at least one of the captured images to determine whether at least one failure mode is present within the captured portion of the moving element;
- registering, by the at least one processor, the at least one image with at least one other image to obtain further information about the at least one failure mode;
- keeping track of monitored locations and determining whether all parts of the moving element have been captured and analyzed based on image registration;
- maintaining, in a memory, a registry indicating parts of the moving element monitored and a respective date and/or time; and
- providing output indicating whether the at least one failure mode is identified within the moving element.

18. The method according to claim 17, wherein said obtaining and analyzing are performed repeatedly until images of all parts of the moving elements have been obtained and analyzed within a predefined timeframe.

19. The method according to claim 17, wherein said output is provided by updating a database, sending a message, displaying a message on a display device, or issuing a vocal alert.

20. The method according to claim 17, further comprising:
- obtaining an indication of whether the moving element is in motion relative to the monitored system; and
- performing said capturing, said analyzing and said registering subject to the moving element being in motion.

* * * * *